United States Patent
Bujold et al.

(10) Patent No.: US 10,851,886 B2
(45) Date of Patent: Dec. 1, 2020

(54) POWER TRANSFER ASSEMBLY WITH PLANETARY GEARSET HAVING CARRIER WITH CRACK ARRESTING FEATURES

(71) Applicant: Magna Powertrain of America Inc., Troy, MI (US)

(72) Inventors: Michael Bujold, Royal Oak, MI (US); Ralph Larson, Olivet, MI (US)

(73) Assignee: MAGNA POWERTRAIN OF AMERICA INC., Troy, MI (US)

( * ) Notice: Subject to any disclaimer, the term of this patent is extended or adjusted under 35 U.S.C. 154(b) by 0 days.

(21) Appl. No.: 16/548,283

(22) Filed: Aug. 22, 2019

(65) Prior Publication Data
US 2020/0063856 A1 Feb. 27, 2020

Related U.S. Application Data

(60) Provisional application No. 62/722,298, filed on Aug. 24, 2018.

(51) Int. Cl.
| | |
|---|---|
| *F16H 57/08* | (2006.01) |
| *B60K 17/344* | (2006.01) |
| *F16H 1/28* | (2006.01) |
| *F16D 11/14* | (2006.01) |

(52) U.S. Cl.
CPC ......... *F16H 57/082* (2013.01); *B60K 17/344* (2013.01); *F16H 1/28* (2013.01); *F16D 11/14* (2013.01)

(58) Field of Classification Search
None
See application file for complete search history.

(56) References Cited

U.S. PATENT DOCUMENTS

| | | | |
|---|---|---|---|
| 6,561,944 B2* | 5/2003 | Lu | ............................ F16H 57/08 |
| | | | 475/331 |
| 6,902,508 B2* | 6/2005 | Stille | ....................... B64C 27/12 |
| | | | 464/182 |

(Continued)

OTHER PUBLICATIONS

Lei, et al.; Nonlinear dynamic modeling of a helicopter planetary gear train for carrier plate crack fault diagnosis, 2016 Chinese Society of Aeronautics and Astronautics (Year: 2016).*

(Continued)

*Primary Examiner* — Dirk Wright
(74) *Attorney, Agent, or Firm* — Dickinson Wright PLLC

(57) ABSTRACT

A two-speed transfer case for a four-wheel drive vehicle is provided. The transfer case has a two-speed planetary gearset, a range clutch, and a range shift mechanism. The planetary gearset includes a carrier unit having at least one crack arresting feature configured to limit propagation of a stress crack. The carrier unit includes a plurality of mounting holes for securing planet gears for rotation relative to the carrier unit. The gearset includes a sun gear configured for and a ring gear, with the planet gears in meshed engagement with the sun gear and the ring gear. The crack arresting feature extends at least partially through a portion of the carrier unit and is configured to receive a crack propagating from a central aperture of the carrier unit. The crack arresting feature is disposed radially between the central aperture and the mounting holes.

20 Claims, 28 Drawing Sheets

(56) References Cited

U.S. PATENT DOCUMENTS

| | | | | |
|---|---|---|---|---|
| 6,994,651 B2* | 2/2006 | Fox et al. | ............... | F16H 57/08 |
| | | | | 475/331 |
| 7,011,599 B2* | 3/2006 | Becquerelle | .......... | F16H 1/2827 |
| | | | | 475/331 |
| 8,216,108 B2* | 7/2012 | Montestruc | ............. | F16H 57/08 |
| | | | | 475/346 |
| 8,550,955 B2* | 10/2013 | Erno et al. | .............. | F16H 57/08 |
| | | | | 475/331 |
| 8,758,190 B2* | 6/2014 | Montestruc | ............. | F16H 57/08 |
| | | | | 475/346 |
| 8,763,251 B2* | 7/2014 | McCune | ................... | F16H 1/28 |
| | | | | 29/893.1 |
| 9,869,385 B1* | 1/2018 | Shah | .................... | F16H 57/082 |

OTHER PUBLICATIONS

Keller, et al. ; Vibration Monitoring of UH-60A Main Transmission Planetary Carrier Fault; Presented at the American Helicopter Society 59thAnnual Forum, Phoenix, Arizona, May 6-8, 2003. Copyright © 2003 by the American Helicopter SocietyInternational, Inc. All rights reserved. (Year: 2003).*

* cited by examiner

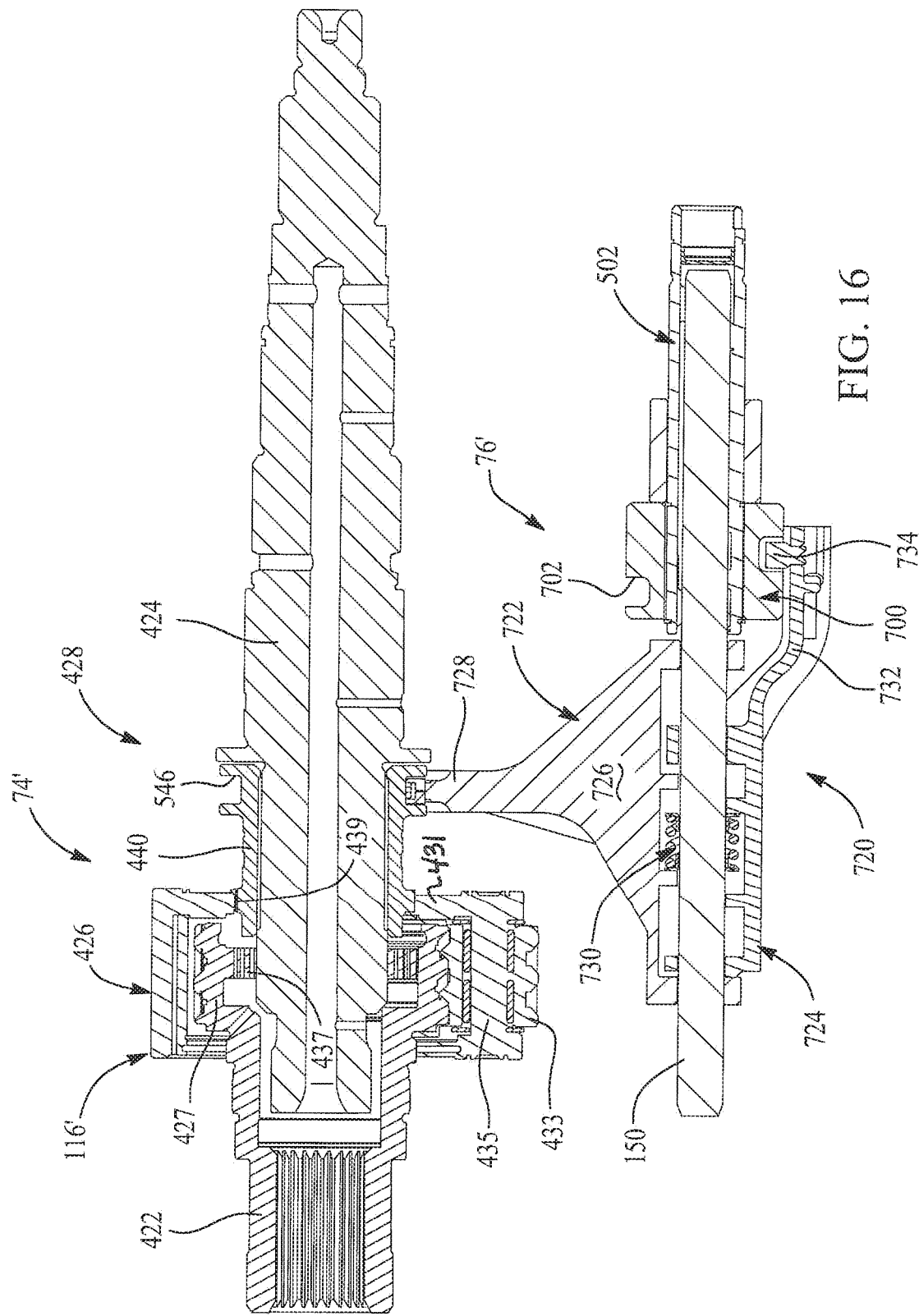

POWER TRANSFER ASSEMBLY WITH PLANETARY GEARSET HAVING CARRIER WITH CRACK ARRESTING FEATURES

CROSS-REFERENCE TO RELATED APPLICATIONS

The present application claims the benefit of previously filed U.S. Provisional Patent Application, No. 62/722,298, filed Aug. 24, 2018, the entire content of which is hereby incorporated by reference in its entirety.

FIELD

The present disclosure relates generally to power transfer systems for controlling the transmission of drive torque from a powertrain to a driveline of a motor vehicle. Such power transfer systems include power transfer assemblies, such as multi-speed transmissions and transfer cases, equipped with a planetary gearset for providing a speed reducing function. Specifically, the present disclosure relates to a carrier unit associated with such a planetary gearset manufactured to include crack mitigating apertures configured to provide a "crack arresting" feature.

BACKGROUND

This section of the written disclosure provides background information related to conventional power transfer systems of the type used in motor vehicles and is not necessarily prior art to the inventive concepts disclosed and claimed in this application.

Power transfer systems are utilized in four-wheel drive (4WD) motor vehicles for selectively directing power (i.e. drive torque) from the powertrain to primary and secondary drivelines. In 4WD vehicles, the power transfer system is usually configured to include a power splitting device, commonly referred to as a transfer case, arranged to normally transmit drive torque to the primary/rear driveline and selectively transmit a portion of the total drive torque to the secondary/front driveline. Typically, such transfer cases include a rear output shaft interconnecting the powertrain to the rear driveline, a front output shaft interconnected to the front driveline, a transfer assembly drivingly coupled to the front driveline, a mode clutch operably disposed between the rear output shaft and the transfer assembly, and a mode shift mechanism operable to shift the mode clutch between a disengaged condition and an engaged condition. With the mode clutch operating in its disengaged condition, the transfer assembly is disconnected from the rear output shaft so as to establish a two-wheel drive mode. In contrast, the mode clutch is operable in its engaged condition to drivingly connect the transfer assembly to the rear output shaft so as to establish a four-wheel drive mode.

In "part-time" power transfer systems, the transfer case is equipped with a dog-type positive-locking mode clutch and a mechanical mode shift mechanism that can be actuated manually (i.e. via an operator-actuated shift lever) or electrically (i.e. via an electric motor). Typically, such dog-type mode clutches include a mode sleeve splined for rotation with the rear output shaft and which is axially moveable thereon via the mode shift mechanism between disengaged and engaged positions with respect to a clutch component coupled to the transfer assembly for respectively shifting between the two-wheel drive mode and a "locked" four-wheel drive mode.

It is also known to use "on demand" power transfer systems for automatically distributing drive torque from the powertrain to the front and rear drivelines, without any input or action on the part of the vehicle operator, when a low traction condition is detected. Modernly, the on-demand feature is incorporated into transfer cases by replacing the dog-type mode clutch and mechanical mode shift mechanism with a multi-plate friction clutch assembly and a power-operated clutch actuator that are interactively associated with an electric control system and a sensor arrangement. During normal road and driving conditions, the friction clutch assembly is maintained in a released condition such that virtually all drive torque is transmitted to the rear wheels via the rear driveline and the two-wheel drive mode is established. However, when the sensors anticipate or detect a low traction condition, the power-operated clutch actuator is actuated to engage the friction clutch assembly for transmitting a portion of the total drive torque to the front wheels via the front driveline, thereby establishing an "on-demand" four-wheel drive mode. Examples of such on-demand or "active" transfer cases are disclosed in U.S. Pat. Nos. 8,091,451; 8,316,738; and 8,678,158.

To accommodate differing road surfaces and conditions, many transfer cases are also equipped with a two-speed range unit, a range clutch and a range shift mechanism. The two-speed range unit typically includes an input shaft directly driven by the powertrain, a planetary gearset having an input member driven by the input shaft and an output member driven at a reduced speed relative to the input member. The range clutch is usually a dog-type positive-locking range collar splined for rotation with the rear output shaft and axially moveable thereon between a first or high-range position coupled to the input member and a second or low-range position coupled to the output member.

Typically, the planetary gearset includes a sun gear fixed to the input shaft, a stationary ring gear, and a plurality of planet gears in constant mesh with the sun gear and the ring gear. The planet gears are rotatably supported from a carrier unit. When the range clutch is located in its high-range position, it functions to couple the sun gear to the rear output shaft for establishing a direct or high-ratio drive connection therebetween. In contrast, when the range clutch is located in its low-range position, it functions to couple the carrier unit to the rear output shaft for establishing a reduced or low-ratio drive connection between the input shaft and the rear output shaft. To establish these drive connections, clutch teeth formed on the axially moveable range clutch move into and out of engagement with clutch teeth formed on the sun gear (or the input shaft) and clutch teeth formed on the carrier unit.

In many applications, the carrier unit is two-piece assembly having a pair of interconnected laterally-spaced carrier plates with pinion shafts extending therebetween and on which the planet gears are mounted for rotation. In other applications, the carrier unit is formed as a one-piece component, such as a powdered metal component, with the pinion shafts again used to rotatably support the planet gears. Typically, the clutch teeth are hardened to accommodate the cyclical loads and stresses generated upon engagement with the clutch teeth on the range clutch. As is known, deflection of the rear output shaft causes high tooth stress at the carrier unit since partial clutch tooth engagement situation increases such stresses. These high tooth stresses can, unfortunately, lead to cracks forming and propagating from the clutch teeth until the carrier unit breaks and is no longer functional.

Thus, a need exists to develop carrier units for planetary gearsets of the type used in power transfer systems having a crack-arresting feature configured to inhibit and/or limit the growth of stress-related cracks so as to extend the service life of such carrier units during exposure to cyclical loading conditions.

SUMMARY

This section provides a general summary of the inventive concepts associated with this disclosure and is not intended to be interpreted as a complete and comprehensive listing of all of its aspects, objectives, features and advantages.

It is an aspect of the present disclosure to provide a power transfer assembly for use in motor vehicle driveline applications which is equipped with a planetary gearset having a carrier unit with a crack arresting feature.

It is a related aspect of the present disclosure to configure the crack arresting feature as crack mitigating apertures that are formed in the carrier unit in generally close proximity to a load bearing feature, such as spline and/or clutch teeth.

It is a further related aspect of the present disclosure to configure the crack mitigating apertures as throughbores and/or partial depth indentations formed in/on the carrier unit.

It is an aspect of the present disclosure to provide a two-speed transfer case for use in four-wheel drive vehicles equipped with a range mechanism having a two-speed planetary gearset and a range clutch, and a range shift mechanism for shifting the range clutch.

In accordance with these and other aspects, the present disclosure is directed to a planetary gearset comprising a sun gear, a ring gear, a carrier unit, and a plurality of planet gears rotatably supported by the carrier unit and in constant meshed engagement with the sun gear and the ring gear, wherein the carrier unit is formed to include a crack arresting feature configured to inhibit propagation of a stress crack.

The carrier unit includes teeth formed around an aperture, wherein the crack arresting feature is located in close proximity to the teeth so as to inhibit propagation of a stress crack originating at one of the teeth.

The crack arresting feature may include a plurality of crack mitigating apertures formed adjacent to the teeth. The crack mitigating apertures may be throughbores and/or partial depth bores formed in the carrier unit. The crack arresting apertures may be circular or lobe-shaped. The crack arresting apertures may be aligned along a common diameter and be spaced equally or in a staggered orientation. The crack arresting aperture may include first and second pluralities of throughbores and/or partial depth bores, with each of the first and second pluralities being aligned respectively along a common first and second diameter.

The crack arresting feature may be in the form of arc-shaped apertures or slots that extend partially or fully through the carrier ring of the carrier unit. The arc-shaped apertures may have a radially inner end a radially outer end with a curvature defined therebetween. The arc-shaped apertures may be curved to correspond to the curvature of the mounting holes of the carrier unit that are disposed adjacent the arc-shaped apertures. The curvature may be concave in the radially outer direction and convex in the radially inner direction. The arc-shaped apertures may be arranged on the carrier ring in the expected path of a crack propagating from the teeth of the carrier unit, which may be determined by FEA.

In view of these and other aspects, the present disclosure is directed to a two-speed transfer case configured to include: an input shaft adapted to receive drive torque from a powertrain; a rear output shaft adapted for connection to a rear driveline; a front output shaft adapted for connection to a front driveline; a transfer assembly drivingly connected to one of the front and rear output shafts, a two-speed range mechanism operably disposed between the input shaft and the rear output shaft; a range shift mechanism for controlling operation of the two-speed range mechanism; a mode mechanism operably disposed between the transfer assembly and the other one of the front and rear output shafts; and a mode shift mechanism for controlling operation of the mode mechanism, wherein the range mechanism includes a planetary gearset equipped with a carrier unit having crack arresting apertures.

In accordance with one non-limiting embodiment, the two-speed transfer case of the present disclosure includes a mode mechanism configured as a multi-plate friction clutch assembly, a mode shift mechanism configured as a motor-actuated ballramp unit to control a clutch engagement force applied to the multi-plate friction clutch assembly, a range mechanism configured to include a planetary gearset and a positive-locking range clutch moveable between two range positions for establishing high-range and low-range drive connections, and a range shift mechanism configured to include a range fork engaging the range clutch and having a follower retained in the guide slot formed in the range cam, and a shift operator for rotating the range cam to cause the follower to move within a multi-step range shift segment of the guide slot which causes the range fork to axially move the range clutch between its high-range and low-range positions.

In one aspect, a transfer case for a vehicle is provided, the transfer case comprising: a rotary input shaft operational at a first speed; a rotary output shaft; a sun gear configured for concurrent rotation with the rotary input shaft; a ring gear; a carrier unit; a planet gear rotatably supported by said carrier unit and in meshed engagement with said sun gear and said ring gear; a range mechanism configured to shift between meshed engagement with the rotary input shaft to drive the rotary output shaft at the first speed and meshed engagement with the carrier unit to drive the rotary output shaft at a second speed; wherein said carrier unit is formed to include at least one crack arresting feature configured to inhibit propagation of a stress crack.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 16 is a partial sectional view of a two-speed transfer case constructed in accordance with a seventh embodiment configured to include a range shift mechanism having a range cam;

Figure 32:
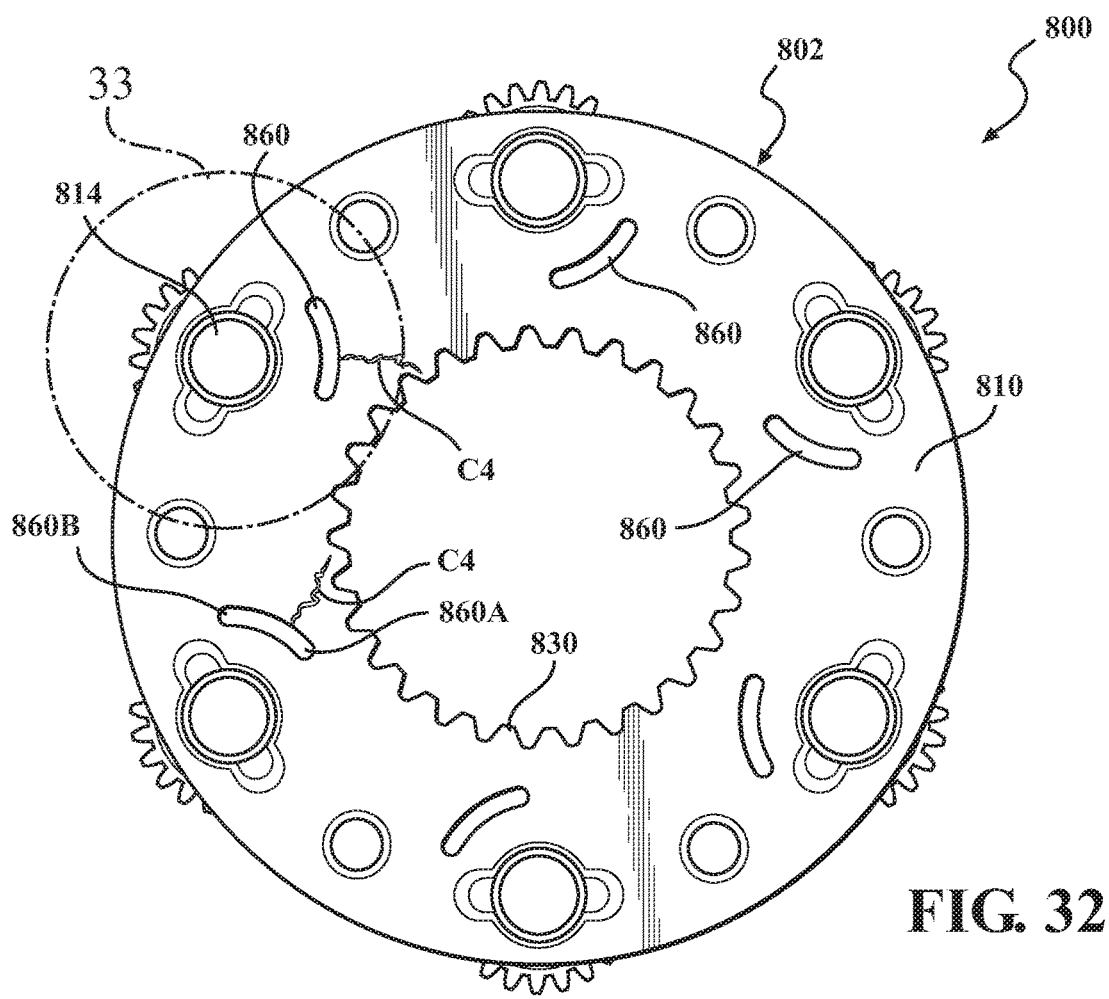
Figure 33:
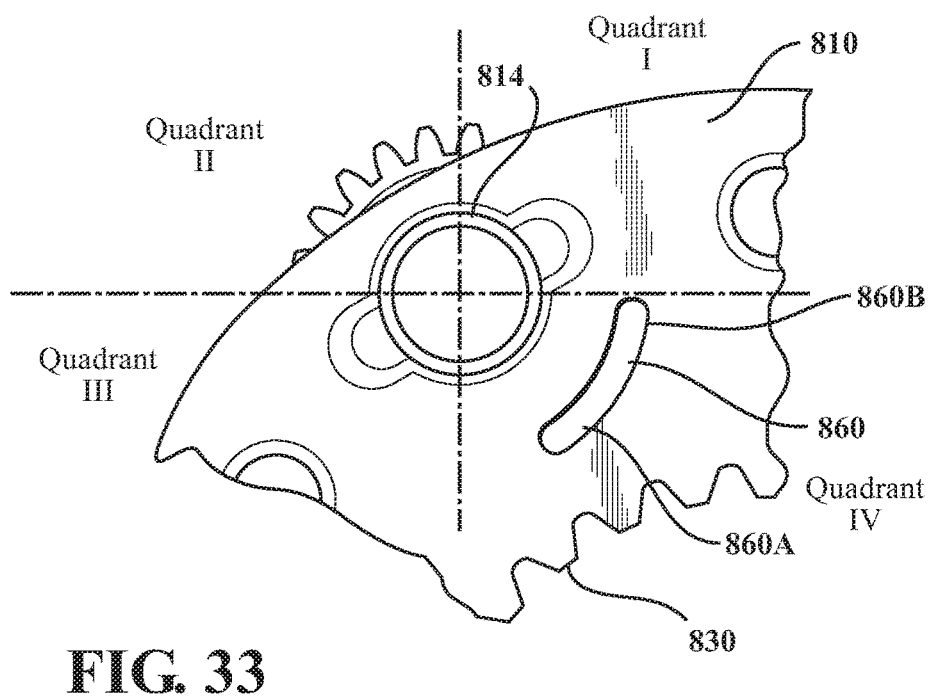

FIG. 32 illustrates the carrier unit of the planetary gearset configured to include a crack arresting feature according to a fifth non-limiting embodiment, with the crack arresting feature having an arc shape; and FIG. 33 illustrates a position of the arc-shaped crack arresting feature relative to a mounting hole of the carrier unit, with the arc-shaped crack arresting feature disposed in the expected path of a crack propagating from the teeth of the carrier toward the mounting hole.

DETAILED DESCRIPTION

Example embodiments will now be described more fully with reference to the accompanying drawings. In particular, a plurality of non-limiting embodiments of a two-speed active transfer case adapted for use with four-wheel drive vehicles are provided so that this disclosure will be thorough and will fully convey the true and intended scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps operations, elements, components, and/or groups or combinations thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
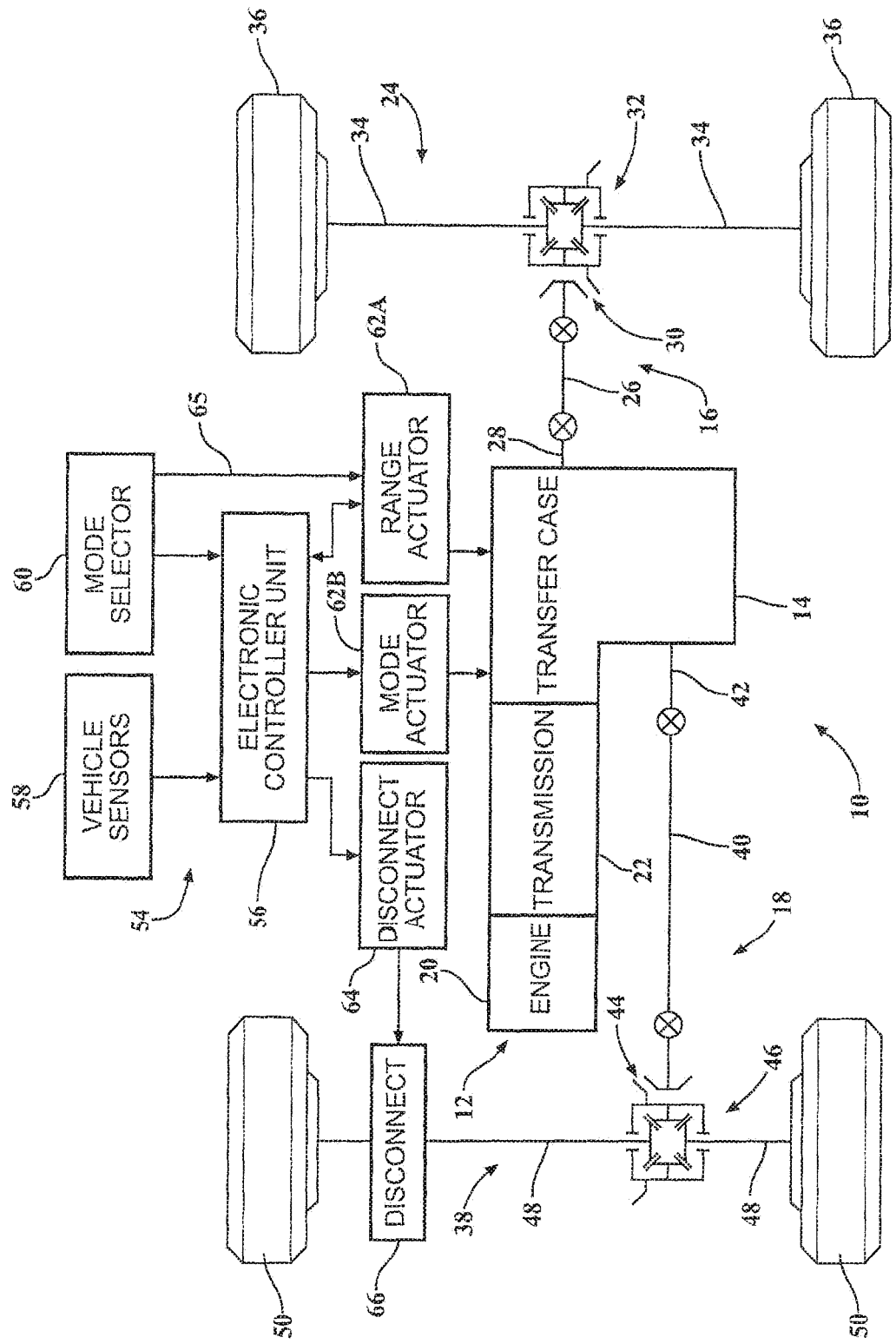
FIG. 1 is a schematic illustration of a four-wheel drive motor vehicle equipped with a power transfer system having a two-speed transfer case constructed in accordance with the teachings of the present disclosure.

Referring initially to FIG. 1 of the drawings, an example drivetrain for a four-wheel drive motor vehicle 10 is shown to include a powertrain 12 operable to generate rotary power (i.e., drive torque) which is transmitted through a power transfer unit, hereinafter transfer case 14, to a primary driveline 16 and to a secondary driveline 18. Powertrain 12 is shown, in this non-limiting example, to include a power source such as an internal combustion engine 20 and a transmission 22. In the particular arrangement shown, primary driveline 16 is a rear driveline and generally includes a rear axle assembly 24 and a rear propshaft 26 arranged to drivingly interconnect a rear output shaft 28 of transfer case 14 to an input of rear axle assembly 24. The input to rear axle assembly 24 includes a hypoid gearset 30 connected to rear propshaft 26. Rear axle assembly 24 includes a rear differential assembly 32 driven by hypoid gearset 30, and a pair of rear axleshafts 34 interconnecting rear differential assembly 32 to a pair of ground-engaging rear wheels 36. Secondary driveline 18 is a front driveline and includes a front axle assembly 38 and a front propshaft 40 arranged to drivingly interconnect a front output shaft 42 of transfer case 14 to an input of front axle assembly 38. The input to front axle assembly 38 includes a hypoid gearset 44 connected to front propshaft 40. Front axle assembly 38 includes a front differential assembly 46 driven by hypoid gearset 44, and a pair of front axleshafts 48 interconnecting front differential assembly 46 to a pair of ground-engaging front wheels 50.

Motor vehicle 10 is also shown to include a traction control system 54 having an electronic controller unit 56 configured to receive input signals from vehicle sensors 58 and a mode selector 60 and to subsequently provide control signals to one or more actuators. Mode selector 60 is, in this non-limiting example, a manually-operable device within the passenger compartment of vehicle 10 and, for example, may include a shift lever. Controller unit 56 can provide control signals to one or more transfer case actuators 62 and an axle disconnect actuator 64. As will be detailed with greater specificity, the at least one transfer case actuators 62 may include a range actuator 62A associated with a two-speed range mechanism to provide high-range and low-range drive connections, and a mode actuator 62B associated with a mode mechanism to provide two-wheel drive and four-wheel drive modes of operation.

In some of the embodiments of transfer case 14 to be described hereinafter, mode selector 60 is adapted to mechanically operate range actuator 62A to control operation of the range shift mechanism, as indicated by leadline 65. Range actuator 62A, in such embodiments, provides a range signal to ECU 56 that is indicative of the particular drive connection (namely, the high-range or the low-range) selected and established. Disconnect actuator 64 controls operation of a disconnect device 66 associated with front axle assembly 38 for selectively coupling and uncoupling front driveline 18 relative to transfer case 14. Sensors 58 are configured to provide information to controller unit 56 indicative of the current operational characteristics of vehicle 10 and/or road conditions for use in controlling operation of transfer case 14. The information provided by sensors 58 may include, without limitations, information related to vehicle speed, driveline/wheel speeds, acceleration, braking status, steering angle, throttle position, lateral displacement, and/or rain sensors. Mode selector 60 permits a vehicle operator to select operation of vehicle 10 in one of the available drive modes which may include, without limitation, a two-wheel high-range (2WH) drive mode, an automatic four-wheel high-range (AUTO-4WH) drive mode, a locked four-wheel high-range (LOCK-4WH) drive mode, a Neutral mode, a locked four-wheel low-range (LOCK-4WL) drive mode, and an automatic four-wheel low-range (AUTO-4WL) drive mode.

Figure 2:
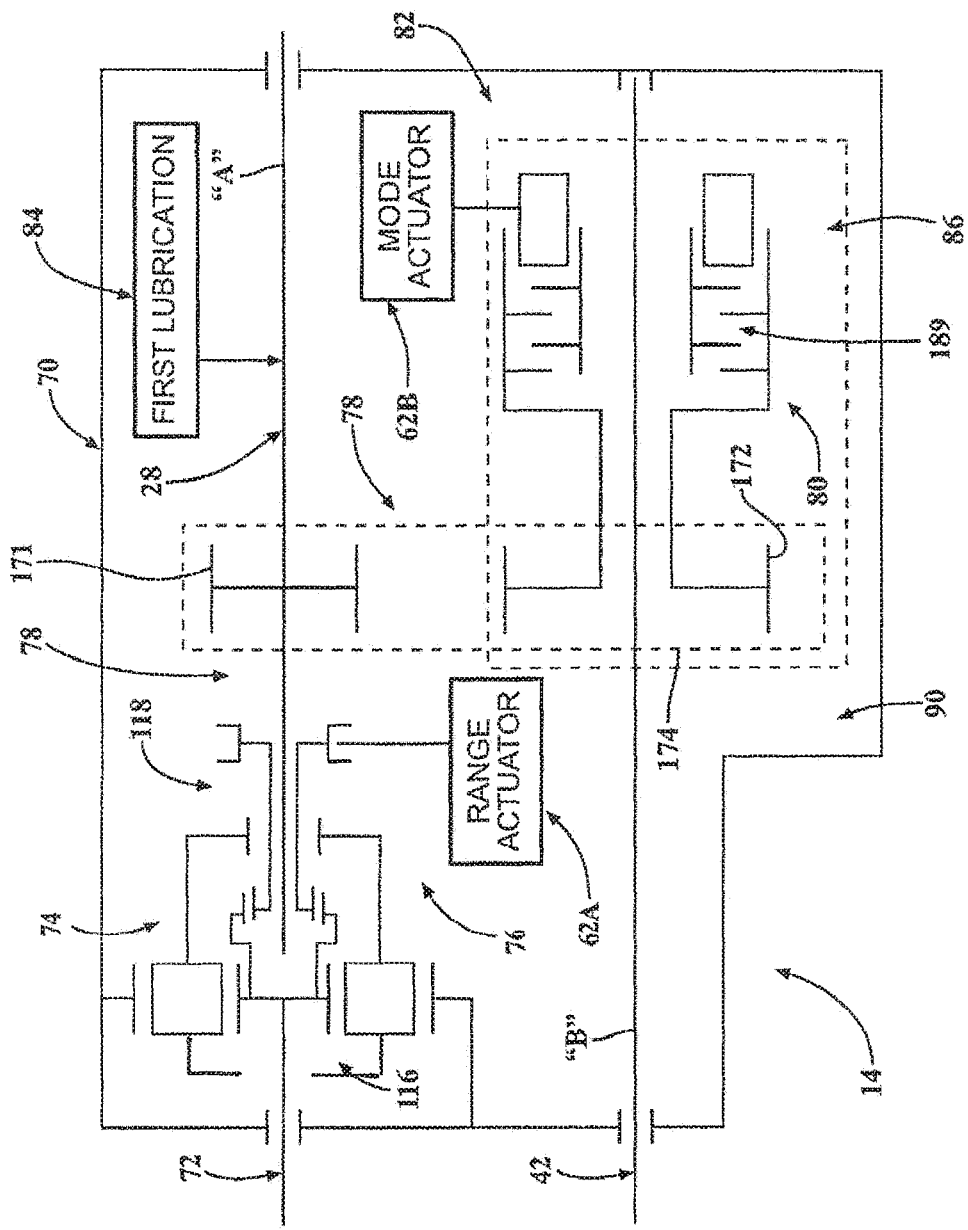
FIG. 2 is a diagrammatical illustration of a two-speed active transfer case including a planetary gearset equipped with a carrier unit having crack arresting features which embody the teachings of the present disclosure.

Referring now to FIG. 2 of the drawings, a stick diagram of an example embodiment of transfer case 14 constructed in accordance with the present disclosure is provided. Transfer case 14 is generally shown to include: a housing assembly 70; an input shaft 72 rotatably supported by housing assembly 70; a two-speed range mechanism 74 disposed between input shaft 72 and rear output shaft 28; a range shift mechanism 76 controlling operation of two-speed range mechanism 74; a transfer mechanism 78 driven by rear output shaft 28; a mode mechanism 80 disposed between transfer mechanism 78 and front output shaft 42; a mode shift mechanism 82 controlling operation of mode mechanism 80; a first lubrication mechanism 84 associated with rear output shaft 28; and a second lubrication mechanism 86 (shown in phantom lines) associated with front output shaft 42. As is evident, range mechanism 74 is arranged in association with a first rotary axis "A" of transfer case 14 while mode mechanism 80 is arranged in association with a second rotary axis "B" of transfer case 14. With transfer case 14 installed in vehicle 10, the first axis is generally parallel but offset above the second axis with housing assembly 70 configured to define a sump area 90 filled with a lubricating oil in an area generally configured to locate at least a portion of mode mechanism 80 within sump area 90. Transfer case 14 is also shown in FIG. 2 to include range actuator 62A in association with range shift mechanism 76, and mode actuator 62B in association with mode shift mechanism 80 which is controlled by controller unit 56.

Figure 3:
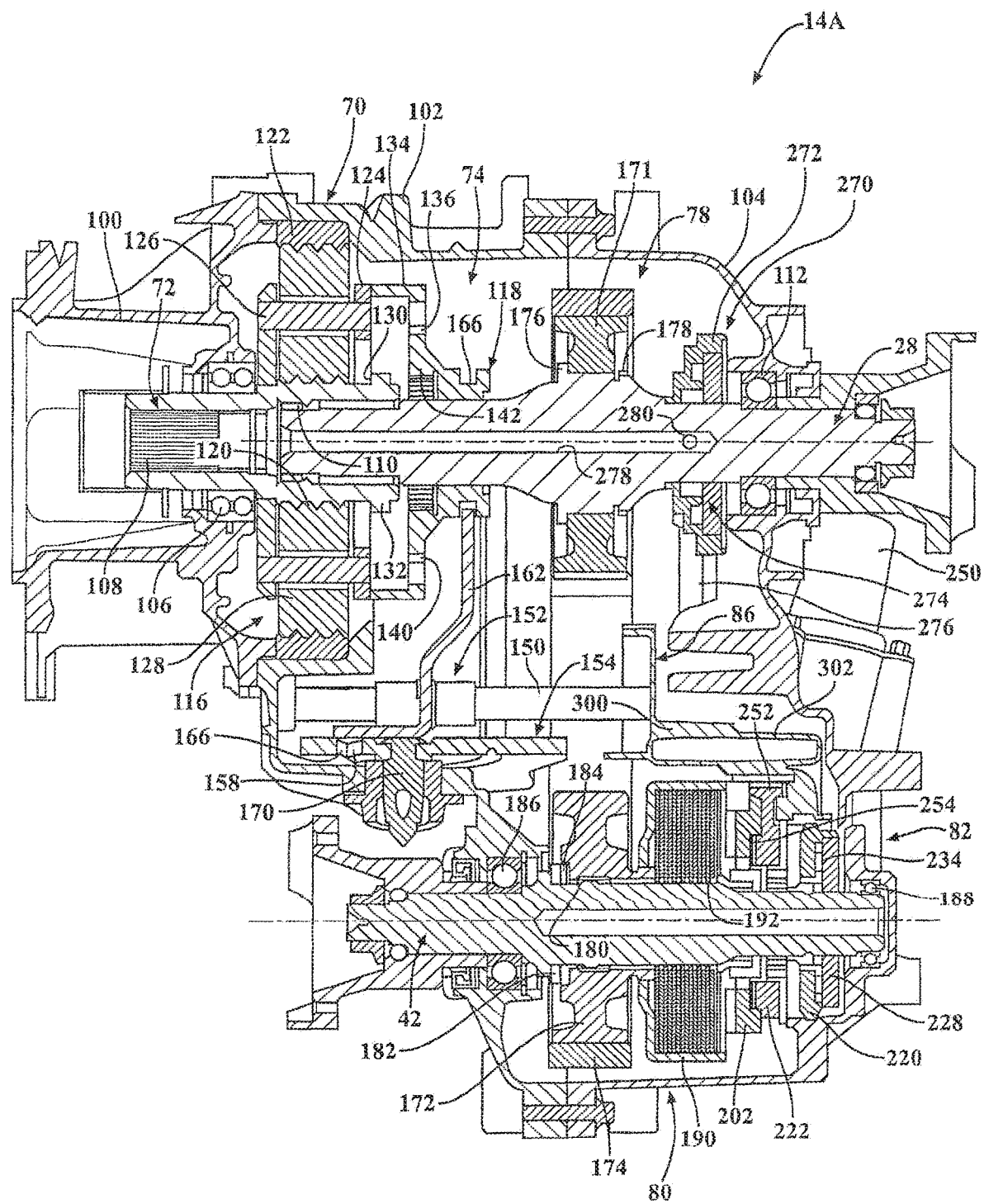
FIG. 3 is a sectional view of a two-speed active transfer case constructed in accordance with a first embodiment.

With particular reference now to FIG. 3, a first non-limiting embodiment of transfer case 14 originally shown in FIGS. 1 and 2, is identified by reference numeral 14A. Housing assembly 70 is shown, in this non-limiting example, to include a multi-piece configuration having an adapter housing section 100, a front housing section 102, a rear housing section 104, and a rear end cap 105. Adapter housing section 100 is configured to be rigidly secured to transmission 22 and includes a bearing assembly 106 rotatably supporting input shaft 72. Input shaft 72 includes internal splines 108 adapted to matingly engage with external splines formed on a transmission output shaft. Rear output shaft 28 is supported for rotation relative to input shaft 72 by a first bearing assembly 110 disposed between input shaft 72 and rear output shaft 28, and a second bearing assembly 112 disposed between rear housing section 104 and rear output shaft 28.

Range mechanism 74 is shown, in this non-limiting embodiment, to include a planetary gearset 116 and a range clutch 118. Planetary gearset 116 includes a sun gear 120 formed integrally on input shaft 72, a ring gear 122 non-rotatably fixed to front housing section 102, a carrier unit 124 having a plurality of pins 126, and a plurality of planet gears 128 each rotatably mounted (via a bearing assembly) on a corresponding one of pins 126 and which are each in constant meshed engagement with sun gear 120 and ring gear 122. Input shaft 72 includes a clutch ring segment 130 having external clutch teeth 132 formed thereon. Carrier unit 124 can be a two-piece arrangement with a pair of laterally-spaced carrier plates between which pins 126 extend or, in the alternative, can be a one-piece (i.e. powdered metal) member formed with openings within which planet gears 128 are rotatably supported on pins 126. Carrier unit 124 may also include a clutch ring segment 134 having internal clutch teeth 136 formed thereon. Range clutch 118 is configured as a sliding range collar that is splined for common rotation with rear output shaft 28. Range collar 118 also includes external clutch teeth 140 and internal clutch teeth 142. Range collar 118 is axially moveable on rear output shaft 28 between three (3) distinct range positions.

Range collar 118 is moveable between a high-range (H) position, a neutral (N) position, and a low-range (L) position. When range collar 118 is located in its H range position (shifted to the left relative to the position shown in FIG. 3), its internal clutch teeth 142 engage external clutch teeth 132 on input shaft 72 so as to establish a first or "direct" (i.e., high-range) speed ratio drive connection between input shaft 72 and rear output shaft 28. In contrast, when range collar 118 is located in its L range position (illustrated in FIG. 3), its external clutch teeth 140 engage internal clutch teeth 136 on carrier unit 124 so as to establish a second or "reduced" (i.e., low-range) speed ratio drive connection between input shaft 72 and rear output shaft 28. Location of range collar 118 in its N position disengages rear output shaft 28 from driven connection with input shaft 72 and carrier unit 124 so as to interrupt the transfer of drive torque and permit relative rotation therebetween. Accordingly, the high-range drive connection is established when range collar 118 is located in its H range position and the low-range drive connection is established when range collar 118 is located in its L range position. The two-speed range mechanism shown and described is intended to exemplify any suitable gear reduction device capable of establishing two distinct speed ratio drive connections between input shaft 72 and rear output shaft 42.

Range shift mechanism 76 is shown, in the non-limiting embodiment, to include a shift rail 150 mounted between front and rear housing sections 102 and 104 of housing assembly 70, a range fork unit 152 slideably disposed on shift rail 150, and a rotary-to-linear conversion device configured as a sector plate 154 having a range guide slot 156 within which a range pin 158 extends. Range pin 158 extends outwardly from a tubular hub segment 160 of range fork unit 152 such that rotation of sector plate 154 causes linear movement of range fork unit 152 due to range pin 158 moving within range guide slot 156. As will be described with further detail hereinafter, the profile of the range guide slot 156 may comprise a plurality of different cam sections configured to optimize the axial loading generated to move range collar 118. In a preferred arrangement, a plurality of three (3) interconnected slot segments of range guide slot 156, each having a different slope (rate), is provided with sector plate 154. Range fork unit 152 further includes a fork segment 162 extending outwardly from hub segment 160 and having a pair of bifurcated forks 164 that are retained in an annular groove 166 formed in range collar 118. Therefore, axial movement of range fork unit 152 results in sliding movement of range collar 118 between its three distinct range positions. While not specifically shown, a power-operated version of range actuator 62A may include an electric motor for rotatably driving a sector shaft 170 that is, in turn, coupled to sector plate 154 so as to move range fork unit 152 which in turn moves range collar 118 into the desired range position in response to rotation of sector shaft 170. As an alternative, range actuator 62A may include a mechanical linkage assembly interconnecting a shift lever in the passenger compartment of vehicle 10 to sector shaft 170 and which is operable to cause rotation of sector plate 154 in response to movement of the shift lever. Those skilled in the art will appreciate that any suitable arrangement capable of axially moving range fork unit 152 to facilitate movement of range collar 118 between its three (3) distinct range positions is within the meaning of range actuator 62.

Transfer mechanism 78 is shown in the non-limiting example, to include a first transfer component driven by rear output shaft 28 and which is arranged to transfer drive torque to a second transfer component rotatably supported on front output shaft 42. Transfer mechanism 78 is a chain and sprocket type of drive assembly including a first sprocket 171 acting as the first transfer component, a second sprocket 172 acting as the second transfer component, and a power chain 174 encircling first sprocket 171 and second sprocket 172. First sprocket 171 is splined for common rotation with rear output shaft 28 and is axially retained between a radial flange 176 and a snap-ring 178. Second sprocket 172 is rotatably mounted on front output shaft 42 via a needle bearing assembly 180. A retainer ring 182 and a radial thrust bearing assembly 184 are also disposed between second sprocket 172 and front output shaft 42. Front output shaft 42 is rotatably supported by housing assembly 70 via a pair of laterally-spaced roller bearing units 186 and 188. It is contemplated that alternative transfer mechanisms, such as gear drive arrangements, can be used with transfer case 14A to transfer drive torque from rear output shaft 28 to a transfer component rotatably supported on front output shaft 42.

Mode mechanism 80 is best shown in this non-limiting example to include a wet-type multi-plate friction clutch assembly 189 disposed between second sprocket 172 and front output shaft 42 for facilitating adaptive torque transfer therebetween. Friction clutch assembly 189 generally includes a first clutch member or clutch drum 190 fixed for common rotation with second sprocket 172, a second clutch member or clutch hub 192 mounted to, formed integrally with, an intermediate section of front output shaft 42, and a multi-plate clutch pack 193 comprised of alternatively interleaved outer clutch plates 194 and inner clutch plates 196. Outer clutch plates are splined for rotation with clutch drum 190 while inner clutch plates are splined for rotation with clutch hub 192. Clutch drum 190 is a formed component and includes a plurality of oil transfer holes (not shown) configured to permit lubricant to flow therethrough. A spacer ring 198 is provided between drum 190 and second sprocket 172.

Friction clutch assembly 189 also includes a spring retainer ring 200 fixed (via splines, lugs, etc.) for common rotation with clutch drum 190, an axially-moveable apply plate 202 that is connected for common rotation with spring retainer ring 200, and a plurality of circumferentially aligned return springs 204 disposed between spring retainer ring 200 and apply plate 202. As will be detailed, return springs 204 are configured and arranged to normally bias apply plate 202 in a direction toward a retracted position relative to clutch pack 193. Apply plate 202 includes a plurality of axially-extending and circumferentially-aligned drive lugs 206 which extend through window apertures 208 formed in spring retainer ring 200. Drive lugs 206 are configured to engage and apply a clutch engagement force on clutch pack 193, the magnitude of which controls the amount of drive torque that is transferred from clutch drum 190 to clutch hub 192 through clutch pack 193. While mode mechanism 80 is shown preferably configured as a multi-plate wet-type friction clutch assembly, those skilled in the art will recognize that such a mode mechanism is intended to represent any type of mode clutch or coupling capable of selectively coupling front output shaft 42 for rotation with second sprocket 172 of transfer mechanism 78 for facilitating the transfer of drive torque to front driveline 18.

Figure 7:
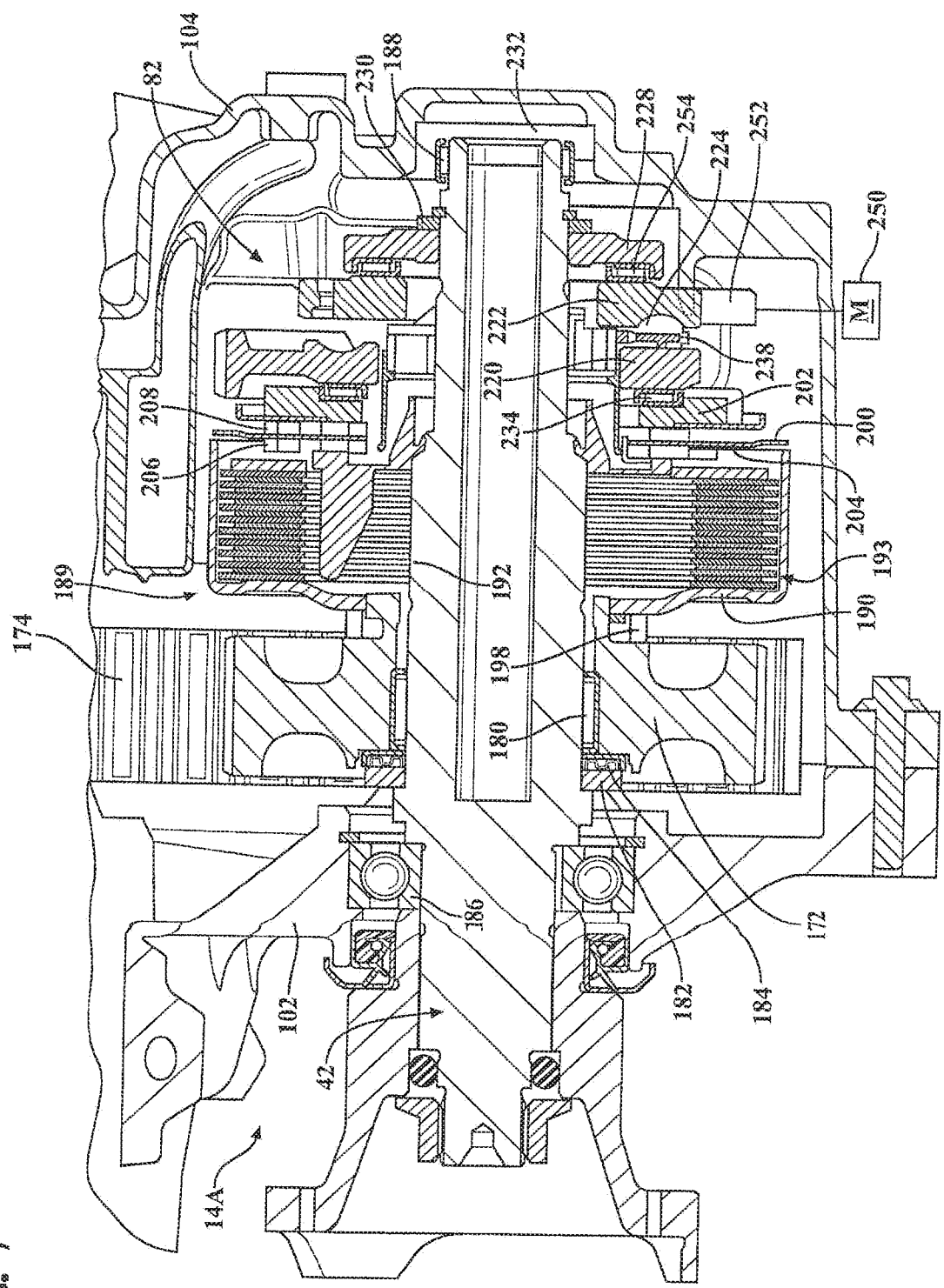
FIG. 7 is an enlarged partial sectional view showing various components of the active mode clutch associated with the transfer cases shown in FIGS. 3 through 6.

Mode shift mechanism 82 is best shown, in the non-limiting example of FIGS. 3 and 7, to include a motor-driven rotary-to-linear conversion device of the type commonly referred to as a ballramp unit. As is evident, FIGS. 3 and 7 illustrate slightly different embodiments of the mode shift mechanism 82. The ballramp unit generally includes a first cam ring 220, a second cam ring 222, and followers 224 disposed in aligned cam tracks formed therebetween. In FIG. 3, the first cam ring 220 is shown to the right of the second cam ring 222. In FIG. 7, the first cam ring 220 is shown to the left of the second cam ring 222. First cam ring 220 is non-rotatably fixed to housing assembly 70 via an anti-rotation tab. First cam ring 220 is also fixed axially and is located against a backing plate 228 via a shim ring 230 and a snap ring 232. Backing plate 228 is splined for rotation with front output shaft 42 such that a radial thrust bearing unit 234 is disposed between first cam ring 220 and backing plate 228. First cam ring 220 has a plurality of circumferentially-aligned first cam tracks which followers 224 engage. Second cam ring 222 includes a matching plurality of second cam tracks against which followers 224 also rollingly engage. A pair of cage plates 238 retain and align followers 224 relative to first cam tracks 236 and second cam tracks 240. Second cam ring 222 is adapted to move axially relative to first cam ring 220 as a result of rotation of second cam ring 222 relative to first cam ring 220. As such, the profile and/or contour of cam tracks and controls the linear motion of second cam ring 222. An electric motor 250 acts as mode actuator 62B and has a rotary output driving a gear (not shown) that is meshed with geared rack segment 252 of second cam ring 222.

As will be understood, the direction and amount of rotation of the electric motor's output controls the direction and amount of rotation of second cam ring 222 which, in turn, controls the direction and amount of axial travel of second cam ring 222 relative to the clutch pack. As shown in FIG. 3, a thrust bearing assembly 254 is disposed between a face surface of second cam ring 222 and a face surface of apply plate 202 to accommodate rotation of apply plate 202 relative to second cam ring 222 during coordinated axial movement of apply plate 202 with second cam ring 222. Those skilled in the art will appreciate that the alternative ballramp unit where one or both cam rings are rotatable to establish axial movement of one of the cam rings is within the scope of the ballramp unit disclosed herein. Additionally, other rotary-to-linear conversion devices (i.e., ballscrew units), camming devices or pivotable devices configured to control the magnitude of the clutch engagement force applied to clutch pack 193 are considered alternatives for mode shift mechanism 82.

Second cam ring 222 is configured to control axial movement of apply plate 202 between a first or minimum clutch engagement position and a second or maximum clutch engagement position relative to clutch pack 193 of friction clutch assembly 189. With apply plate 202 axially located in its first position, a predetermined minimum clutch engagement force is exerted by drive lugs 206 on clutch pack 193, thereby transferring a minimum amount of drive torque from rear output shaft 28 (through transfer mechanism 78) to front output shaft 42. Typically, no drive torque is transmitted from rear output shaft 28 and transfer mechanism 74 through friction clutch assembly 189 when apply plate 202 is located in its first position, thereby establishing a "released" mode for friction clutch assembly 189 and a two-wheel drive mode (2WD) for transfer case 14A. In contrast, with apply plate 202 axially located in its second position, a predetermined maximum clutch engagement force is exerted by drive lugs 206 on clutch pack 193, thereby transferring a maximum amount of drive torque through friction clutch assembly 189 to front output shaft 42. In this position, a "fully engaged" mode is established for friction clutch assembly 189 and a locked four-wheel drive mode (LOCK-4WD) is established for transfer case 14A. Precise control over the axial location of apply plate 202 between its first and second positions permits adaptive torque transfer from rear output shaft 28 to front output shaft 42 so as to establish an on-demand four-wheel drive (AUTO-4WD) mode for transfer case 14A. Return springs 204 react between spring retainer ring 200 and apply plate 202 so as to normally bias apply plate 202 toward its first position. Those skilled in the art will recognize that mode shift mechanism 82 can be any suitable power-operated arrangement operable for controlling movement of apply plate 202 relative to clutch pack 193. While not shown, a power-off brake can be associated with motor 250 which functions to mechanically hold apply plate 202 in its second position to establish the LOCK-4WD mode and allow motor 250 to be turned off when one of the LOCK-4WD modes is selected.

First lubrication mechanism 84 is shown, in this non-limiting example, to include a lube pump 270 having a pump housing 272 non-rotatably fixed to housing assembly 70, and a pump assembly 274 disposed in a pump chamber formed within housing 272. Pump assembly 274 has a rotary pump member fixed for rotation with rear output shaft 28 and which is operable for drawing lubricant from sump area 90 (through a supply tube 276) into a suction-side inlet portion of the pump chamber formed in pump housing 272. Rotation of the rotary pump member caused by rotation of rear output shaft 28 causes the lubricant to be pressurized and discharged from a pressure-side discharge portion of the pump chamber for delivery to a central lube channel 278 formed in rear output shaft 28 via one or more radial feed ports 280. Thereafter, the lubricant in control lube channel 278 is radially dispersed via radial discharge ports to provide lubricant to the various rotary components aligned with the "A" axis. In one embodiment, lube pump 270 could be a gearotor pump.

Second lubrication mechanism 86 is shown, in this non-limiting embodiment, to be configured to catch lubricant splashed from clutch drum 190, second sprocket 172 and chain 174 and to transfer the captured lubricant for use in lubricating and cooling components associated with mode mechanism 80 and other rotary components aligned with the "B" axis. In general, second lubrication mechanism 86 is a "splash recovery" lubrication system that is operable for use in power transfer units having a multi-plate friction clutch assembly disposed, at least partially, for rotation in a lubricant sump, such as sump area 90. The splash recovery clutch lubrication system associated with the various transfer cases of the present disclosure is applicable to other power transfer units of the type used in vehicular drivetrain applications to provide a "pumpless" solution to lubricating rotary components aligned for rotation along a rotary axis positioned in proximity to a lubrication sump. The splash recovery clutch lubrication system provides a means for supplying lubricant to a control portion of a rotating clutch located in the lubricant sump. The present disclosure also eliminates pump priming concerns at low RPM since as the rotational speed increases, the lubricant splashes and reduces the sump height. However, the recovery system feeds lubricant back into the clutch system without concerns related to conventional pump priming. Other resulting advantages include minimized spin losses, weight savings, improved packaging and noise reduction over conventional pump systems.

Figure 4:
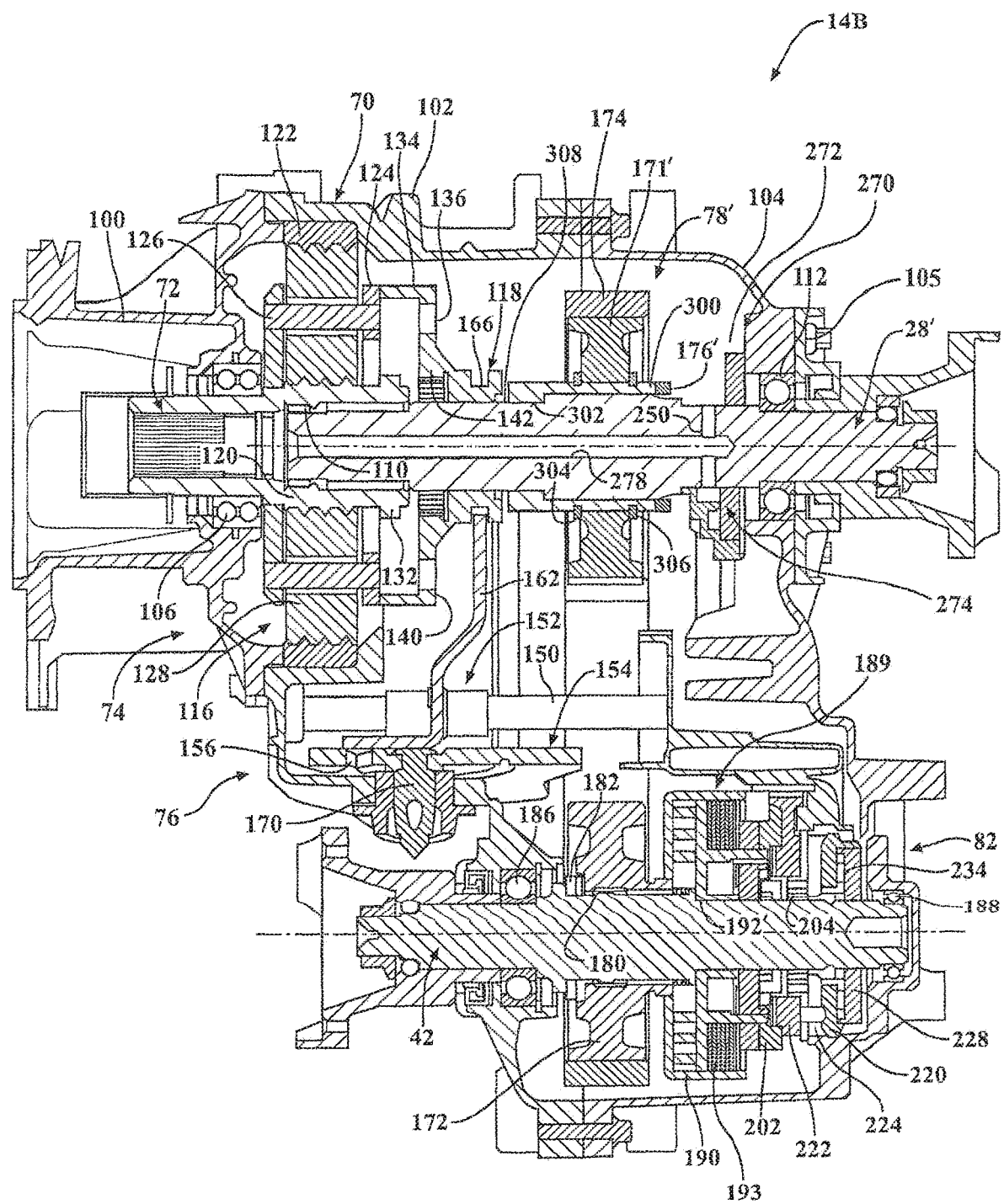
FIG. 4 is a sectional view of a two-speed active transfer case constructed in accordance with a second embodiment.

Referring now to FIG. 4, an alternative embodiment of transfer case 14 is identified by reference numeral 14B. Transfer case 14B is substantially similar in construction and function to transfer case 14A of FIG. 3, with the exception that first sprocket 171' is now drivingly coupled (i.e., splined) to a drive hub 300 which, in turn, is coupled via a splined connection 302 to rear output shaft 28'. A pair of retainer rings 304, 306 axially restrain and locate first sprocket 171' on drive hub 300. Drive hub 300 is retained and axially positioned against a radial shoulder 176' of rear output shaft 28' via a snap ring 308. In addition, clutch hub 192' is now a separate clutch component splined to front output shaft 28. Due to the similarity of the remaining components of transfer case 14B to the previously described components associated with transfer case 14A, common reference numerals are used to identify similar components and further description is not otherwise required. Suffice it to say that transfer case 14B is a two-speed active transfer case capable of establishing all of the drive modes described in relations to transfer case 14A.

Figure 5:
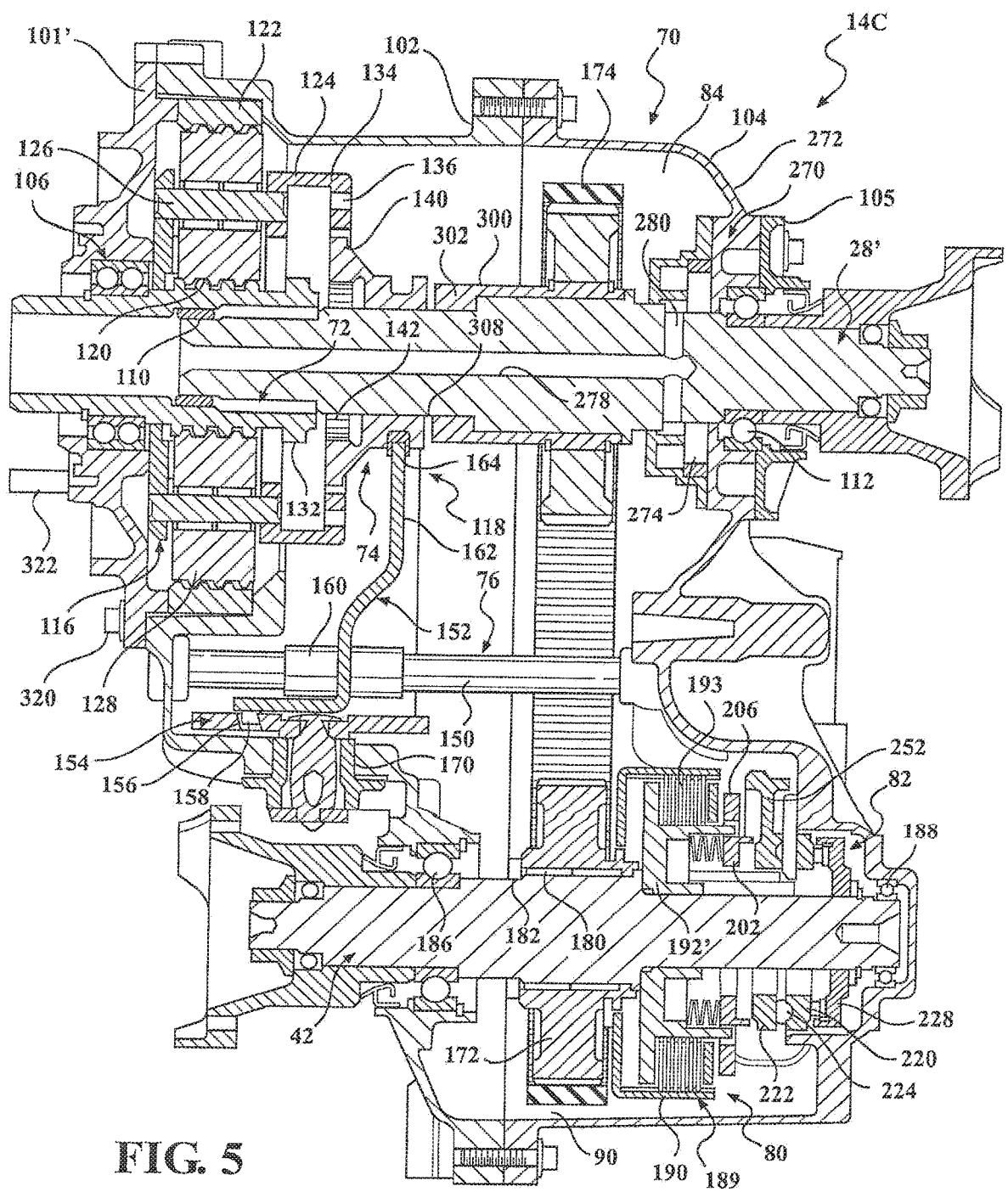
FIG. 5 is a sectional view of a two-speed active transfer case constructed in accordance with a third embodiment.

Referring to FIG. 5, another alternative embodiment of transfer case 14 is identified by reference numeral 14C. Transfer case 14C is substantially similar in construction and functional operation to transfer case 14B of FIG. 4 with the exception that a modified adapter housing section 101' is now associated with multi-piece housing 70. Adapter 101' is secured to housing section 102 via bolts 320 and includes a plurality of mounting studs 322 arranged for retention in alignment apertures formed in the transmission housing. Input shaft 72 extends outwardly from adapter housing 101'. The various arrangements shown in FIGS. 3 through 5 are provided to illustrate the modularity associated with the present disclosure.

Figure 6:
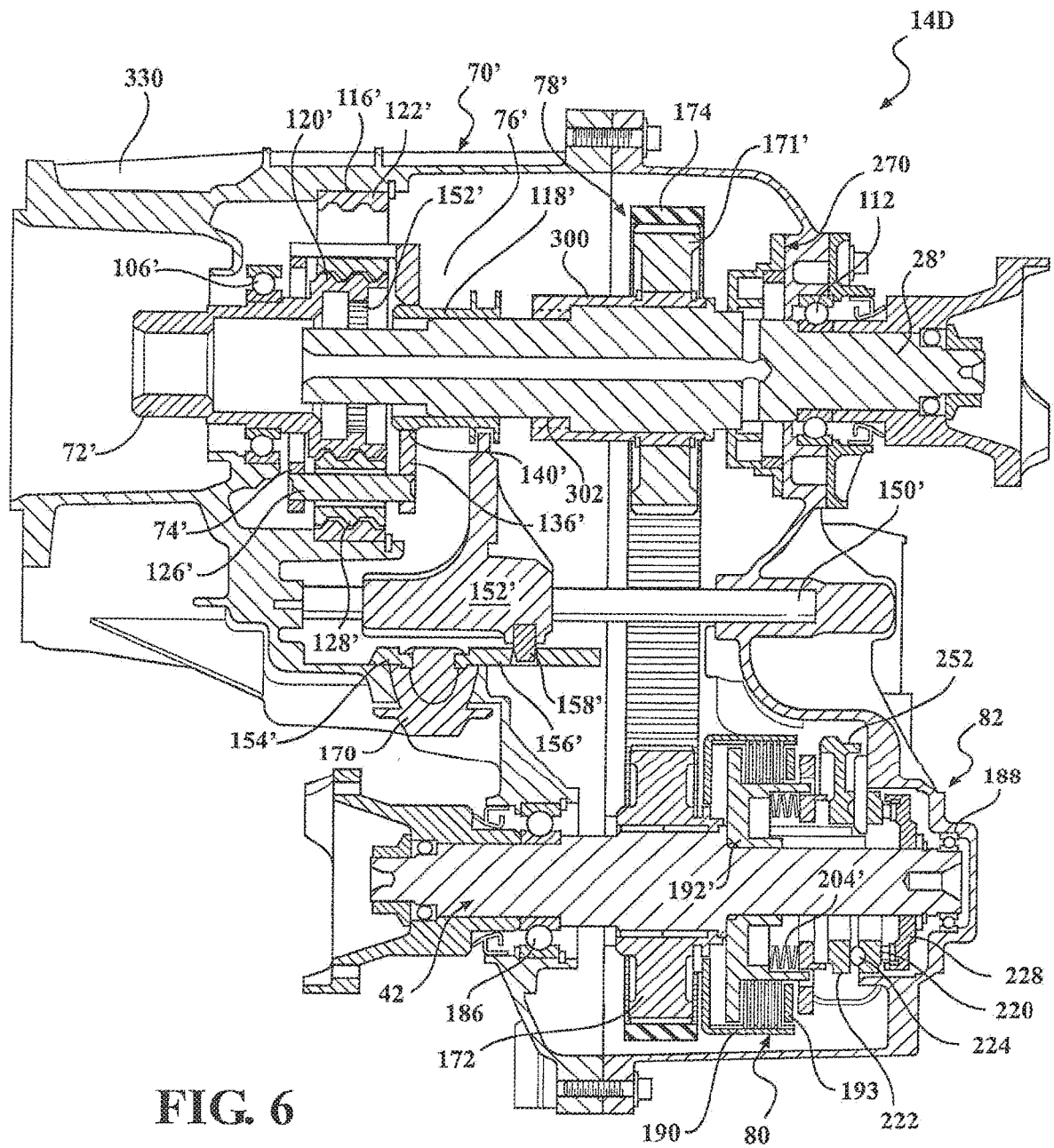
FIG. 6 is a sectional view of a two-speed active transfer case constructed in accordance with a fourth embodiment.

Referring to FIG. 6, yet another alternative embodiment of transfer case 14 is identified by reference numeral 14D. Transfer case 14D is generally similar to transfer cases 14A-14C in structure and functional operation but is now configured to include a slightly modified range shift mechanism 76' and range mechanism 74' in combination with a modified housing assembly 70'. Housing assembly 70' is now shown with adapter section 100 and first housing section 102 of transfer case 14A integrated into a common housing section 330. In addition, input shaft 72' is now shown with sun gear 120' formed on a radially enlarged hub section and which defines internal sun gear clutch teeth 132'. External clutch teeth 140' on range collar 118' are now configured to engage carrier clutch teeth 136' when range collar 118' is located in its L range position and to engage sun gear clutch teeth 132' when range collar 118' is located in its H range position. In addition, range shift mechanism 76' now includes a range fork 152' slideably mounted on shift rail 150' with its range pin 158' retained in a range guide slot 165' formed in sector plate 154'. Mode clutch 80 and mode actuator 82 are similar to the arrangements previously disclosed. Range guide slot 165' is configured to provide a multi-step (multi-rate) profile for optimizing the shift forces generated to move range collar 118'.

Figure 8:
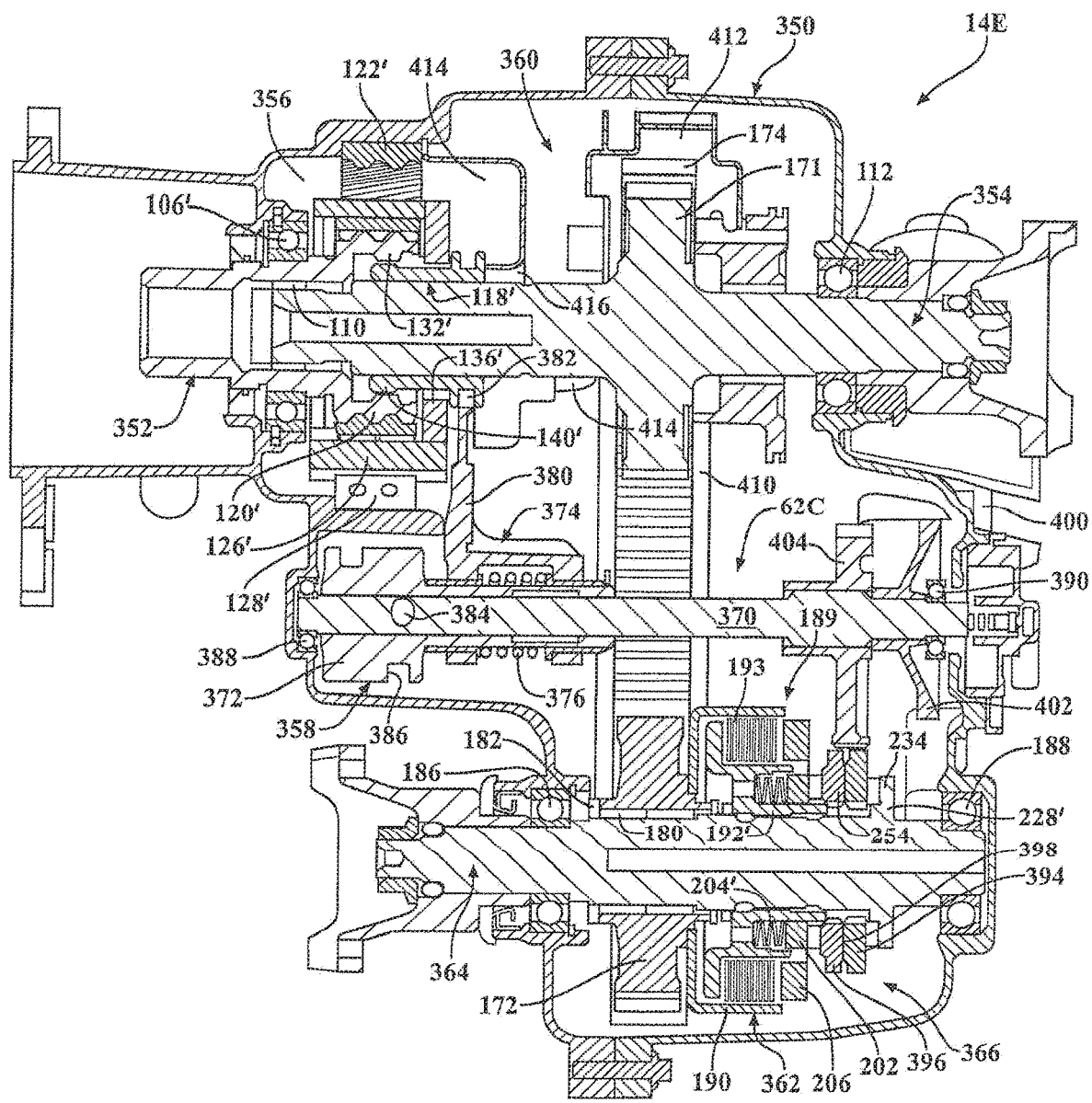
FIG. 8 is a sectional view of a two-speed active transfer case constructed in accordance with a fifth embodiment.

Referring now to FIG. 8, another alternative embodiment of transfer case 14 is identified by reference numeral 14E. Transfer case 14E differs from the previously disclosed alternative embodiments of transfer case 14 in that it is equipped with an "integrated" power-operated range actuator and mode actuator, hereinafter identified as power-operated shift actuator 62C. Transfer case 14E is generally shown to include: a housing assembly 350; an input shaft 352 rotatably supported by housing assembly; a rear output shaft 354 rotatably supported by input shaft 352 and housing assembly 350; a two-speed range mechanism 356 disposed between input shaft 352 and rear output shaft 354; a range shift mechanism 358 controlling operation of two-speed range mechanism 356; a transfer mechanism 360 driven by rear output shaft 354; a mode mechanism 362 disposed between transfer mechanism 360 and a front output shaft 364; a mode shift mechanism 366 controlling operation of mode mechanism 362; and a splash lubrication system 368, all in addition to power-operated shift actuator 62C. As before, range mechanism 356 is arranged in association with a first rotary axis "A" that is shared with input shaft 352 and rear output shaft 354 while mode mechanism 362 and front output shaft share a second rotary axis "B".

Two-speed range mechanism 356 is generally similar to two-speed range mechanism 74' of FIG. 6 and includes planetary gearset 116' and range clutch 118'. Range clutch 118' is a sliding range collar moveable between the H, N, L range positions relative to planetary gearset 116'. Operation of range shift mechanism 358 and mode shift mechanism 366 is controlled and coordinated by power-operated shift actuator 62C. Range shift mechanism 358 generally includes a rotary shift shaft 370, a range cam 372 supported for axial movement on shift rail 370, and a range fork unit 374 mounted via a spring-loaded mechanism 376 on a tube segment 378 of range cam 372. Range fork unit 374 has a fork section 380 engaging a groove 382 formed in range collar 118'. A range pin 384 is fixed for rotation with shift shaft 370 and extends into a range guide slot 386 formed in range cam 372. As will be detailed, range guide slot 386 is configured to include a low-range dwell segment and a high-range dwell segment that are interconnected via a multi-step range shift segment. Shift shaft 370 is shown rotatably supported in housing assembly 350 via a pair of laterally spaced bearings 388, 390. Spring-loaded mechanism 376 is provided to permit axial movement of range cam 372 when a "tooth block" condition exists between range collar 118' and the clutching components of planetary gearset 356 to the desired range position following release of the tooth block condition.

Transfer mechanism 360 is generally similar to transfer mechanism 78 of FIG. 3 and includes first sprocket 171 formed on rear output shaft 354, a second sprocket 172 rotatably supported on front output shaft 364, and an endless power chain 174 encircled therebetween. Mode mechanism 362 is also generally similar to mode mechanism 80 shown in FIGS. 4-6 and includes friction clutch assembly 189 with the components thereof identified by common reference numbers. Mode shift mechanism 366 is a slightly modified version of the ballramp unit and has a first cam plate 394, second cam plate 396, and roller 398 retained in cam tracks formed in the first and second cam plates. First cam plate 394 is supported against a backing ring 228' extending integrally from front output shaft 364 via a bearing assembly 234. Another bearing assembly 254 is positioned between second cam plate 396 and apply plate 202.

In accordance with the construction shown in FIG. 8, power-operated shift actuator 62C includes an electric motor 400 having a rotary output configured to drive a reduction gear 402 fixed (i.e., splined) for rotation with shift shaft 370. A mode cam 404, associated with mode shift mechanism 366, is fixed for rotation with shift shaft 370. Mode cam 404 includes a first cam surface against which a first follower segment of first cam plate 394 rests, and a second cam surface against which a second follower segment of second cam plate 396 rests. The configuration of the first and second cam surfaces are selected to cause at least one of first cam plate 394 and second cam plate 396 to rotate relative to the other which, in turn, results in axial movement of second cam plate 396. This axial movement results in corresponding axial movement of apply plate 202 relative to clutch pack 193, thereby providing adaptive torque transfer between second sprocket 172 and front output shaft 364. Accordingly, the configuration of range guide slot 386 in range cam 372 and the configuration of the mode cam tracks on mode cam 404 are selected to facilitate coordinated movement of range fork unit 374 and apply plate 202 to establish each of the available drive modes. In particular, the low-range dwell segment of range guide slot 386 is configured to maintain range collar 118' in its L range position while the mode cam tracks on mode cam 404 cause movement of apply plate 202 to control adaptive actuation of friction clutch assembly 189. Similarly, the high-range dwell segment of range guide slot 386 is configured to maintain range collar 118' in its H range position while the mode cam tracks on mode cam 404 cause movement of apply plate 202 relative to friction clutch assembly 189. However, the multi-step range shift segment of range guide slot 386 is configured to generate non-linear shift forces required to move range collar 118' between its H and L range position, preferably with friction clutch assembly 189 in a released mode.

Splash lubrication system 368 is shown in FIG. 8 to be configured as a "pumpless" arrangement operable to circulate lubricant splashed during rotation of second sprocket 172 and chain to lubricate components aligned on the rotary axis of front output shaft 364 as well as the rotary axis of rear output shaft 354. Lubrication system 368 is shown to include a guide housing 410 generally enclosing a portion of power chain 174 and first sprocket 171. Guide housing 410 defines a lubricant reservoir segment 412 configured to collect the lubricant. A tube 414 fluidically connects reservoir segment 412 to a lube chamber 414 formed with a bell-shaped lube housing 416 configured to enclose and separate planetary range mechanism 356. This arrangement is configured to direct lubricant to rotary components on mainshaft 352/354.

Referring now to FIGS. 9 through 15, another alternative embodiment of two-speed transfer case 14 is identified by reference numeral 14F. Transfer case 14F also is equipped with an integrated power-operated shift actuator, but is now shown with the multi-plate friction clutch assembly associated with the rear output shaft instead of the front output shaft. Transfer case 14F is generally shown to include: a housing 420; an input shaft 422 rotatably supported by housing 420; a rear output shaft 424 rotatably supported by input shaft 422 and housing 420; a two-speed range mechanism 426 disposed between input shaft 422 and rear output shaft 424; a range shift mechanism 428 controlling operation of two-speed range mechanism 426; a transfer mechanism 430 driven by a front output shaft 432; a mode mechanism 434 disposed between rear output shaft 424 and transfer mechanism 430; a mode shift mechanism 436 controlling operation of mode mechanism 434; and a power-operated shift actuator 438. As before, range mechanism 426 is associated with a first rotary axis shared with input shaft 422 and rear output shaft 424. However, mode mechanism 434 is now also associated with this first axis.

Figure 10:
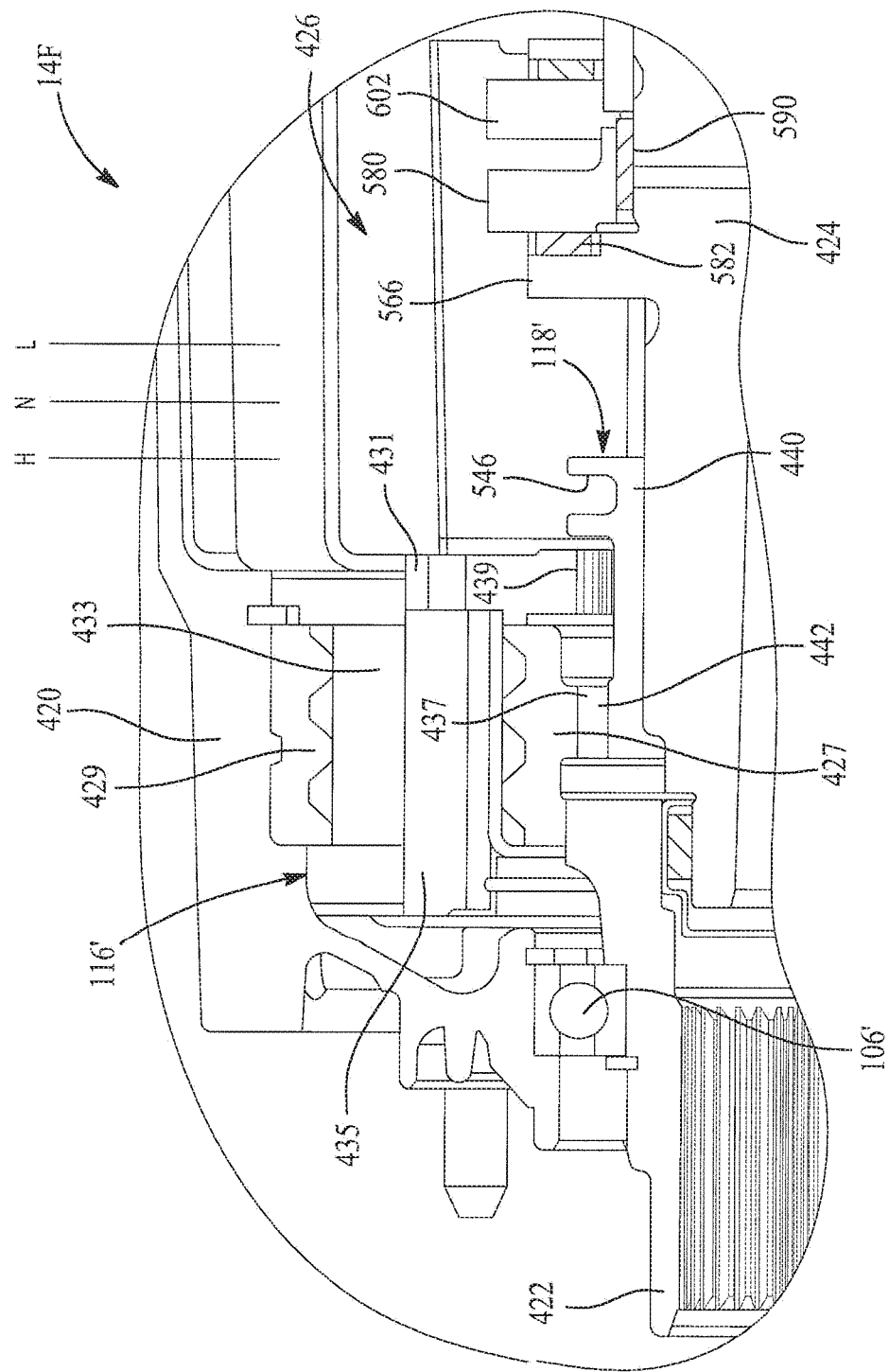
FIG. 10 is an enlarged partial view illustrating the two-speed planetary gearset and range clutch associated with the transfer case shown in FIG. 9.

Two-speed range mechanism 426 is again generally similar to two-speed range mechanisms 79' (FIG. 6) and 356 (FIG. 8) and includes a planetary gearset 116' and a range clutch 118', as is best shown in FIG. 10. Planetary gearset 116' includes a sun gear 427 driven by input shaft 422, a ring gear 429 non-rotatably fixed to housing 420, and a carrier unit 431 rotatably supporting a plurality of planet gears 433 on pinion posts 435 and which are each in constant mesh with sun gear 427 and ring gear 429. Sun gear 427 is formed to include internal clutch teeth 437 while carrier unit 431 is formed to include internal clutch teeth 439.

Range clutch 118' includes a range collar 440 coupled via a spline connection for rotation with and axial sliding movement on rear output shaft 424. Range collar 440 has external clutch teeth 442 adapted to selectively engage either internal clutch teeth 437 formed on input shaft 422 or internal clutch teeth 439 formed on carrier unit 431. Range collar 440 is shown located in a high (H) range position such that its clutch teeth 442 are engaged with clutch teeth 437 on input shaft 422. As such, a direct speed ratio or "high-range" drive connection is established between input shaft 422 and rear output shaft 424. Range collar 440 is axially moveable on rear output shaft 424 from its (H) range position through a central neutral (N) range position into a low (L) range position. Location of range collar 440 in its (N) range position functions to disengage its clutch teeth 442 from both input shaft clutch teeth 437 and carrier clutch teeth 439, thereby uncoupling rear output shaft 424 from driven connection with input shaft 422. In contrast, movement of range collar 440 into its (L) range position causes its clutch teeth 442 to engage clutch teeth 439 on carrier unit 431, thereby establishing the reduced speed ratio or "low-range" drive connection between input shaft 422 and rear output shaft 424.

In the (L) range position, when the input shaft 422 and the sun gear 427 rotate together, the sun gear 427 will cause rotation of the meshed planet gears 433. As the planet gears 433 rotate, the planet gears 433 are meshed with the ring gear 429, which is non-rotatably fixed, such that the result of the rotation of the planet gears 433 is the rotation of the carrier 439. With the carrier 439 engaged with the clutch teeth 442, the rear output shaft 424 thereby rotates in accordance with the rotation of the carrier 431.

Figure 11:
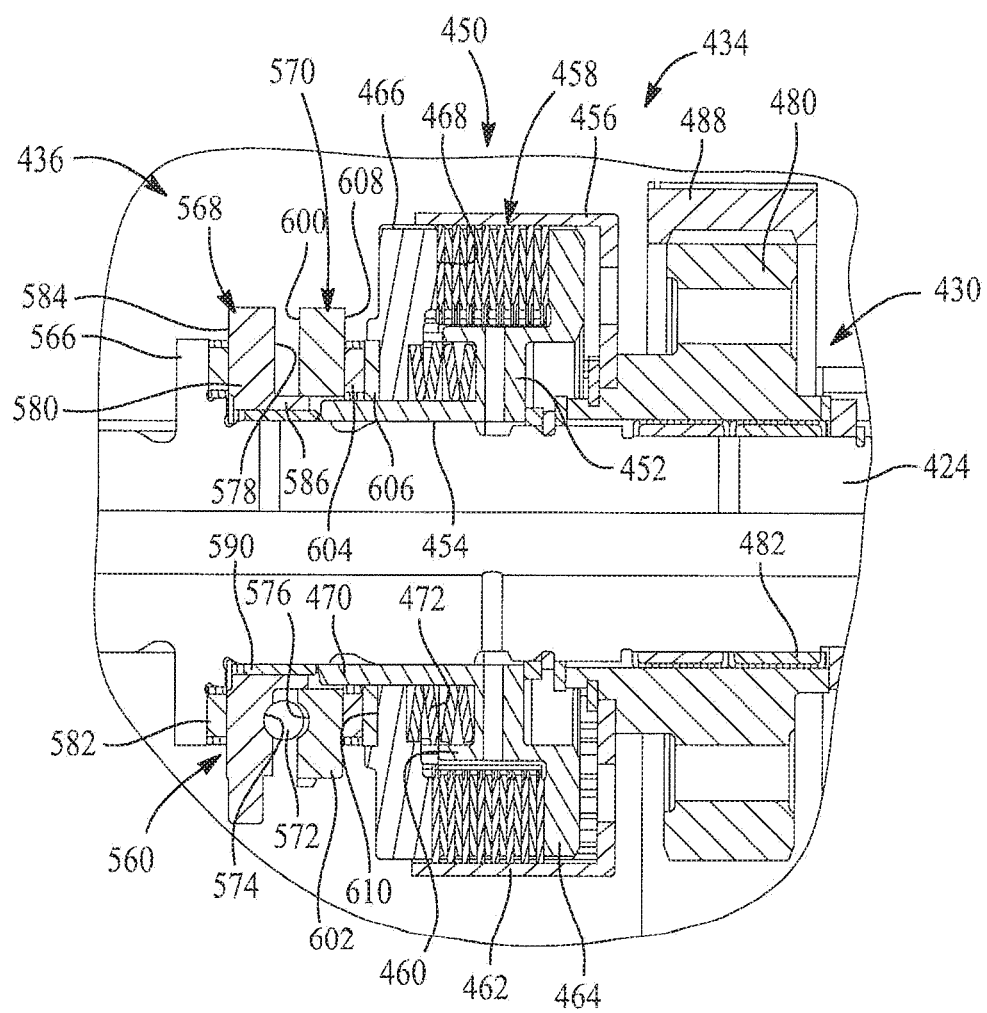
FIG. 11 is an enlarged partial view of FIG. 9 showing the mode clutch and mode shift mechanism in greater detail.

Referring to FIG. 11, mode mechanism 414 is shown to include a mode clutch 450 having a clutch hub 452 fixed via a spline connection 454 for rotation with rear output shaft 424, a clutch drum 456, and a multi-plate clutch pack 458 operably disposed between clutch hub 452 and clutch drum 456. As seen, clutch pack 458 includes a set of inner clutch plates splined to a cylindrical rim segment 460 of clutch hub 452 and which are alternately interleaved with a set of outer clutch plates splined to a cylindrical rim segment 462 of clutch drum 456. Clutch pack 458 is retained for limited sliding movement between a reaction plate segment 464 of clutch hub 452 and a pressure plate 466. Pressure plate 466 has a face surface 468 adapted to engage and apply a compressive clutch engagement force on clutch pack 458. Pressure plate 466 is splined to rim segment 460 for common rotation with clutch hub 452 and is further supported for sliding movement on a tubular sleeve segment 470 of clutch hub 452. A return spring 472 is provided between clutch hub 452 and pressure plate 466 for normally biasing pressure plate 466 away from engagement with clutch pack 458.

Upon engagement of mode clutch 450, drive torque is transmitted from rear output shaft 424 through clutch pack 458 and transfer mechanism 430 to front output shaft 432. Transfer mechanism 430 is a chain drive unit shown to include a first sprocket 480 rotatably supported by bearing assemblies 482 on rear output shaft 434, a second sprocket 484 fixed via a spline connection 486 to front output shaft 432, and a power chain 488 encircling first sprocket 480 and second sprocket 484. Clutch drum 456 is fixed for rotation with first sprocket 480 such that drive torque transferred through mode clutch 450 is transmitted through transfer mechanism 430 to front output shaft 432.

Pressure plate 466 is axially moveable relative to clutch pack 458 between a first or "fully released" position and a second or "fully engaged" position. With pressure plate 466 in its fully released position, a minimum clutch engagement force is exerted on clutch pack 458 such that virtually no drive torque is transferred through mode clutch 450 so as to establish the two-wheel drive (2WD) mode. Return spring 472 is arranged to normally urge pressure plate 466 toward its fully released position. In contrast, location of pressure plate 466 in its fully engaged position causes a maximum clutch engagement force to be applied to clutch pack 458 such that front output shaft 432 is, in effect, coupled via transfer mechanism 430 for common rotation with rear output shaft 424 so as to establish a locked or "part-time" four-wheel drive (4WD) mode. Therefore, accurate control of the position of pressure plate 466 between its fully released and fully engaged positions permits adaptive regulation of the amount of torque transfer between rear output shaft 424 and front output shaft 432, thereby permitting establishment of the adaptive or "on-demand" four-wheel drive (AUTO-4WD) mode.

Power-operated shift actuator 438 is operable to coordinate movement of range collar 440 between its three distinct range positions with movement of pressure plate 466 between its fully released and fully engaged positions. In its most basic form, shift actuator 438 includes an electric motor 500, an actuator shaft 502 driven by electric motor 500, range shift mechanism 428, and mode shift mechanism 436. Actuator shaft 502 has its opposite ends supported by a pair of laterally-spaced bearing assemblies 504 for rotation in housing 420 about a third rotary axis. A reduction geartrain 506 provides a drive connection between a rotary output of electric motor 500 and actuator shaft 502. Reduction geartrain 506 includes a worm gearset (not shown) that is driven by the rotary output of electric motor 500 and a spur gearset 508. Actuation of electric motor 500 causes the worm gearset to drive a drive gear 510 associated with gearset 508. Specifically, drive gear 510 is a small diameter gear supported for rotation on an idler shaft 511 and which is meshed with a large diameter driven gear 512 fixed for rotation with actuation shaft 502. In particular, driven gear 512 includes a tubular hub segment 514 that is fixed via a spline connection 516 to actuator shaft 502 between a radial shaft flange 518 and rear bearing assembly 504. The cumulative reduction ratio provided by geartrain 506 permits the use of a smaller, low power electric motor. An angular position sensor or encoder 520 is mounted to an end portion of actuator shaft 502 for providing ECU 56 with an input signal indicative of the angular position of actuator shaft 502.

Figure 12:
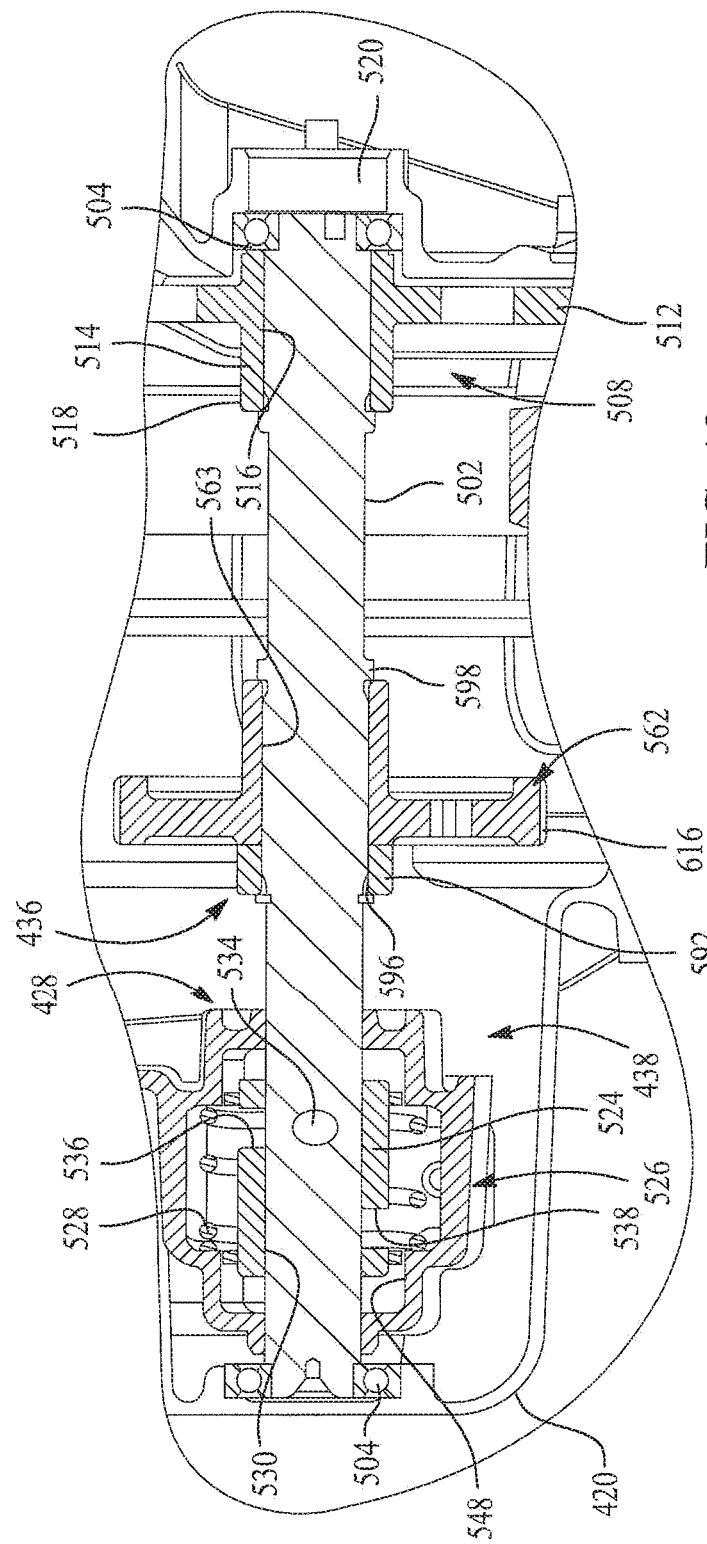
FIG. 12 is an enlarged partial view of FIG. 9 showing components of the integrated mode and range shift mechanism in greater detail.
Figure 13:
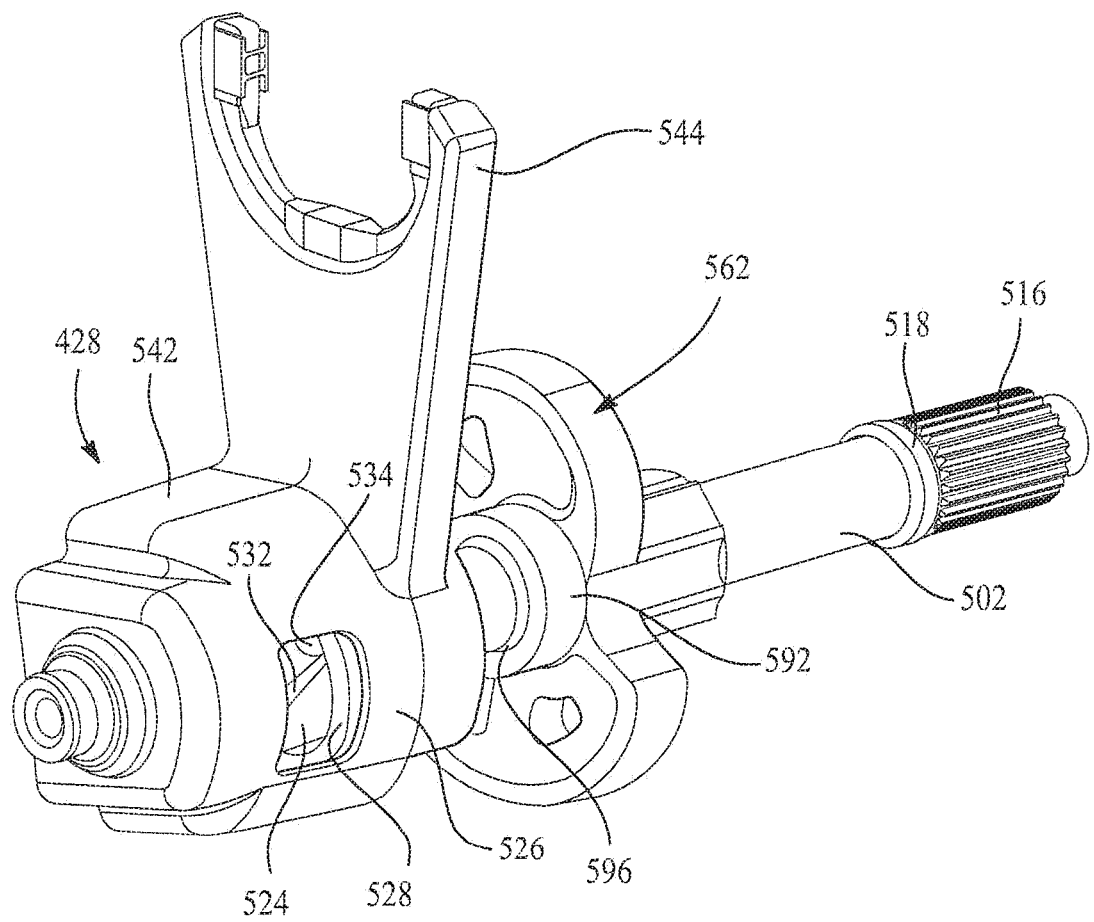
FIGS. 13 and 14 are illustrations of an actuator shaft assembly associated with the integrated mode and range shift mechanism.
Figure 14:
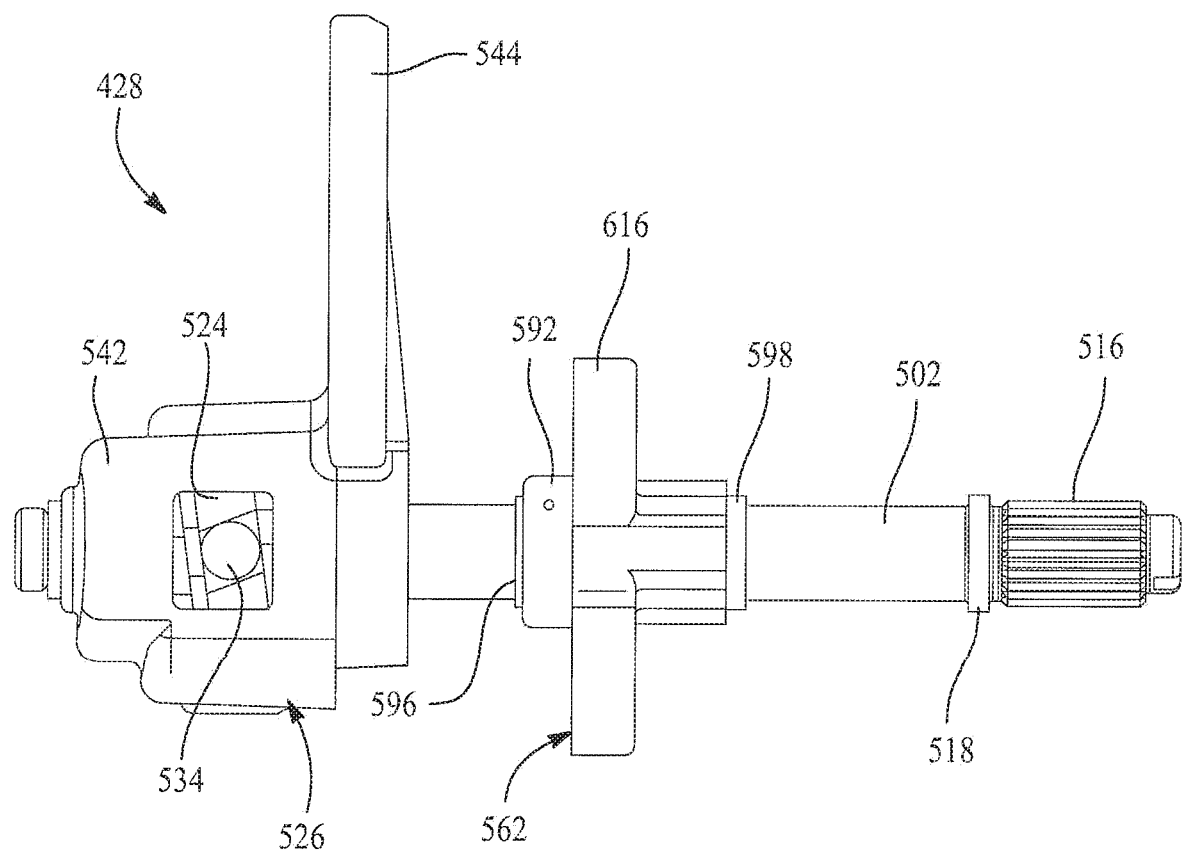

Range shift mechanism 428 is operable to convert bi-directional rotary motion of actuator shaft 502 into bi-directional translational movement of range collar 440 between its three distinct range positions. Referring primarily to FIGS. 12 through 14, range shift mechanism 428 is shown to generally include a range cam 524, a range fork 526 and a spring-biasing unit 528. Range cam 524 is a tubular member having an inner diameter surface 530 journalled for sliding movement on actuator shaft 502. An elongated range guide slot 532 is formed in range cam 524 and receives a follower pin 534 that is fixed for rotation with actuator shaft 502. Guide slot 532 includes a high-range dwell segment 536, a low-range dwell segment 538 and a shift segment 540 interconnecting dwell segments 536 and 538. Range fork 526 includes a sleeve segment 542 supported for sliding movement on actuator shaft 502 and a fork segment 544 which extends from sleeve segment 542 into an annular groove 546 formed in range collar 440. Sleeve segment 542 defines an interior chamber 548 within which range cam 524 and spring-biasing unit 528 are located. Spring-biasing unit 528 is operably disposed between range cam 524 and sleeve segment 542 of range fork 526. Spring-biasing unit 528 functions to urge range fork 526 to move axially in response to axial movement of range cam 524 while its spring compliance accommodates tooth "block" conditions that can occur between shift collar clutch teeth 442 and input shaft clutch teeth 436 or carrier clutch teeth 438. As such, spring-biasing unit 528 assures that range fork 526 will complete axial movement of range collar 440 into its H and L range positions upon elimination of any such tooth block condition.

Range shift mechanism 428 is arranged such that axial movement of range cam 524 relative to actuator shaft 502 results from movement of follower pin 534 within shift segment 540 of range guide slot 532 in response to rotation of actuator shaft 502. As noted, such axial movement of range cam 524 causes range fork 526 to move range collar 440 axially between its three distinct range positions. Specifically, when it is desired to shift range clutch 118' into its high-range drive mode, electric motor 500 rotates actuator shaft 502 in a first direction which, in turn, causes concurrent rotation of follower pin 534. Such rotation causes follower pin 534 to move within shift segment 540 of range guide slot 532 for axially moving range cam 524 and range fork 526 until range collar 440 is located in its H range position. With range collar 440 in its H range position, the high-range drive connection is established between input shaft 422 and rear output shaft 424. Continued rotation of actuator shaft 502 in the first direction causes follower pin 534 to exit shift segment 540 of guide slot 532 and enter high-range dwell segment 536 for preventing further axial movement of range cam 524, thereby maintaining range collar 440 in its H range position. As will be detailed, the length of high-range dwell segment 536 of range guide slot 532 is selected to permit sufficient additional rotation of actuator shaft 502 in the first rotary direction to accommodate actuation of mode clutch 450 by mode shift mechanism 436.

With range collar 440 in its H range position, subsequent rotation of actuator shaft 502 in the opposite or second direction causes follower pin 534 to exit high-range dwell segment 536 and re-enter shift segment 540 of range guide slot 532 for causing range cam 524 to begin moving range collar 440 from its H range position toward its L range position. Upon continued rotation of actuator shaft 502 in the second direction, follower pin 534 exits shift segment 540 of range guide slot 532 and enters low-range dwell segment 538 for locating and maintaining range collar 440 in its L range position, whereby the low-range drive connection between carrier unit 431 and rear output shaft 424 is established. Again, the length of low-range dwell segment 538 of range guide slot 532 is selected to permit additional rotation of actuator shaft 502 in the second rotary direction required to accommodate complete actuation of mode clutch 450.

Mode shift mechanism 436 is operable to convert bi-directional rotary motion of actuator shaft 502 into bi-directional translational movement of pressure plate 466 between its fully released and fully engaged positions so as to permit adaptive regulation of the drive torque transferred through mode clutch 450 to front output shaft 432. In general, as shown in FIG. 11, mode clutch actuator assembly 416 includes a ballramp unit 560 and a mode cam 562. Ballramp unit 560 is supported on rear output shaft 424 between a radial shaft flange 566 and pressure plate 466. Ballramp unit 560 includes a first cam member 568, a second cam member 570 and balls 572 disposed in aligned sets of tapered grooves 574 and 576 formed in corresponding face surfaces of cam members 568 and 570. In particular, grooves 574 are formed in a first face surface 578 on a cam ring segment 580 of first cam member 568. As seen, a thrust bearing assembly 582 is disposed between shaft flange 566 and a second face surface 584 of cam ring segment 580. First cam member 568 further includes a tubular sleeve segment 586 and an elongated lever segment 588. Sleeve segment 586 is supported on rear output shaft 424 via a bearing assembly 590. Lever segment 588 (FIG. 9) has a terminal end portion engaging a spacer collar 592 that is piloted on an and able to rotate relative to actuator shaft 502. As shown in FIG. 12, mode cam 562 is fixed via a spline connection 563 for common rotation with actuator shaft 502. A lock ring 596 axially locates spacer collar 592 and mode cam 562 relative to a radial shaft flange 598.

Referring again to FIG. 11, second cam member 570 of ballramp unit 560 has its grooves 576 formed in a first face surface 600 of a cam ring segment 602 that is shown to generally surround portions of sleeve segment 586 of first cam member 568 and sleeve segment 470 of clutch hub 452. A thrust bearing assembly 604 and thrust ring 606 are disposed between a second face surface 608 of cam ring segment 602 and a face surface 610 of pressure plate 466. Second cam member 570 further includes an elongated lever segment 612 (FIG. 9) having a mode follower 614 mounted at its terminal end that rollingly engages a cam surface 616 formed on an outer peripheral edge of mode cam 562. As will be detailed, the contour of cam surface 616 on mode cam 562 functions to control angular movement of second cam member 570 relative to first cam member 568 in response to rotation of actuation shaft 502. Such relative angular movement between cam members 568 and 570 causes balls 572 to travel along tapered grooves 574 and 576 which, in turn, causes axial movement of second cam member 570. Such axial movement of second cam member 570 functions to cause corresponding axial movement of pressure plate 466 between its fully released and fully engaged positions, thereby controlling the magnitude of the clutch engagement force applied to clutch pack 450.

Lever segment 612 of second cam member 570 is located on one side of actuator shaft 502 while lever segment 588 of first cam member 568 is located on the opposite side of actuator shaft 502. Due to engagement of mode follower 614 with cam surface 616 on mode cam 562, second cam member 570 is angularly moveable relative to first cam member 568 between a first or "retracted" position and a second or "extended" position in response to rotation of actuator shaft 502. With second cam member 570 rotated to its retracted position, return spring 472 biases pressure plate 466 to its fully released position which, in turn, urges balls 572 to be located in deep end portions of aligned grooves 574 and 576. Thus, such movement of second cam member 570 to its angularly retracted position relative to first cam member 568 also functions to locate second cam member 570 in an axially retracted position relative to clutch pack 456. While not shown, a biasing unit may be provided between the lever segments to assist return spring 472 in normally urging second cam member 570 toward its retracted position. In contrast, angular movement of second cam member 570 to its extended position causes balls 572 to be located in shallow end portions of aligned grooves 574 and 576 which causes axial movement of second cam member 570 to an axially extended position relative to clutch pack 456. Such axial movement of second cam member 570 causes pressure plate 466 to be moved to its fully engaged position in opposition to the biasing exerted thereon by return spring 472. Accordingly, control of angular movement of second cam member 570 between its retracted and extended positions functions to control concurrent movement of pressure plate 466 between its fully released and fully engaged positions.

As previously noted, cam surface 616 of mode cam 562 and range guide slot 532 of range cam 524 are configured to coordinate movement of range collar 440 and pressure plate 466 in response to rotation of actuator shaft 502 for establishing a plurality of different drive modes. According to one possible arrangement, mode selector 60 could permit the vehicle operator to select from a number of different two-wheel and four-wheel drive modes including, for example, the two-wheel high-range drive (2WH) mode, the on-demand four-wheel high-range drive (AUTO-4H) mode, the part-time four-wheel high-range drive (4HI) mode, the Neutral (N) mode and the part-time four-wheel low-range drive (4LO) mode. Specifically, control system 54 functions to control the rotated position of actuator shaft 502 in response to the mode signal delivered to ECU 56 by mode selector 60 and the sensor input signals sent by sensors 58 to ECU 56.

Figure 15A:
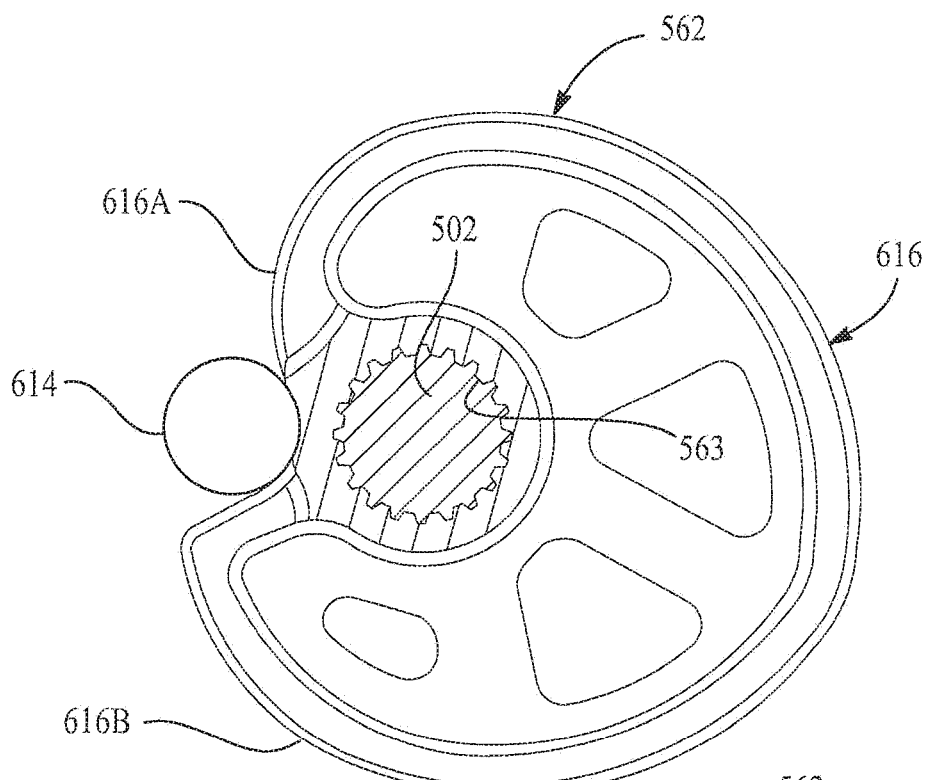
FIGS. 15A through 15F are sectional views generally taken along line A-A of FIG. 14 showing rotated positions of the mode cam for establishing a number of different operating modes.

FIG. 15A illustrates actuator shaft 502 rotated to a "2H" position required to establish the two-wheel high-range drive (2WH) mode. As understood, the two-wheel high-range drive mode is established when range collar 440 is located in its (H) range position and pressure plate 466 is located in its fully released position relative to clutch pack 456. As such, input shaft 422 drives rear output shaft 424 at a direct speed ratio while mode clutch 450 is released such that all drive torque is delivered to rear driveline 16. Mode follower 614 is shown engaging a detent portion of a first cam segment 616A of cam surface 616 on mode cam 562 which functions to locate second cam member 570 in its retracted position.

Figure 15B:
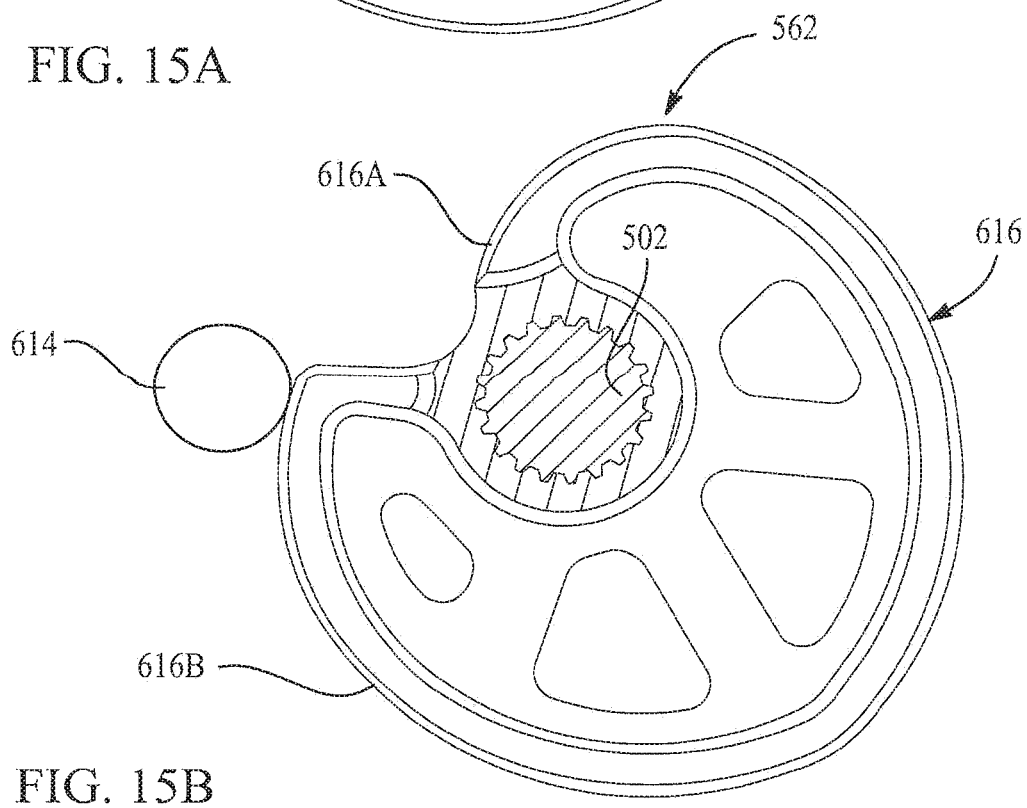

If the on-demand four-wheel high-range drive (AUTO-4H) mode is thereafter selected, electric motor 500 is energized to initially rotate actuator shaft 502 in a first (i.e., clockwise) direction from its 2H position to an "ADAPT-H" position shown in FIG. 15B. In this rotated position of actuator shaft 502, follower pin 534 is located within high-range dwell segment 536 of range guide slot 532 in range cam 524 such that range collar 440 is maintained in its (H) range position for maintaining the direct drive connection between input shaft 422 and rear output shaft 424. However, such rotation of actuator shaft 502 to its ADAPT-H position causes concurrent rotation of mode cam 562 to the position shown which, in turn, causes mode follower 614 to engage a first end portion of a second cam segment 616B of mode cam surface 616. Such movement of mode follower 614 from first cam segment 616A to second cam segment 616B causes second cam member 570 to move angularly relative to first cam member 568 from its retracted position to an intermediate or "ready" position. With second cam member 570 rotated to its ready position, ballramp unit 560 causes pressure plate 466 to move axially from its fully released position into an "adapt" position that is operable to apply a predetermined "preload" clutch engagement force on clutch pack 458. The adapt position of pressure plate 466 provides a low level of torque transfer across mode clutch 450 that is required to take-up clearances in clutch pack 458 in preparation for adaptive torque control. Thereafter, ECU 56 determines when and how much drive torque needs to be transmitted across mode clutch 450 to limit driveline slip and improve traction based on the current tractive conditions and operating characteristics detected by sensors 58. As an alternative, the adapt position for pressure plate 466 can be selected to partially engage mode clutch 450 for establishing a desired front/rear torque distribution ratio (i.e., 10/90, 25/75, 40/60, etc.) between front output shaft 432 and rear output shaft 424.

Figure 15C:
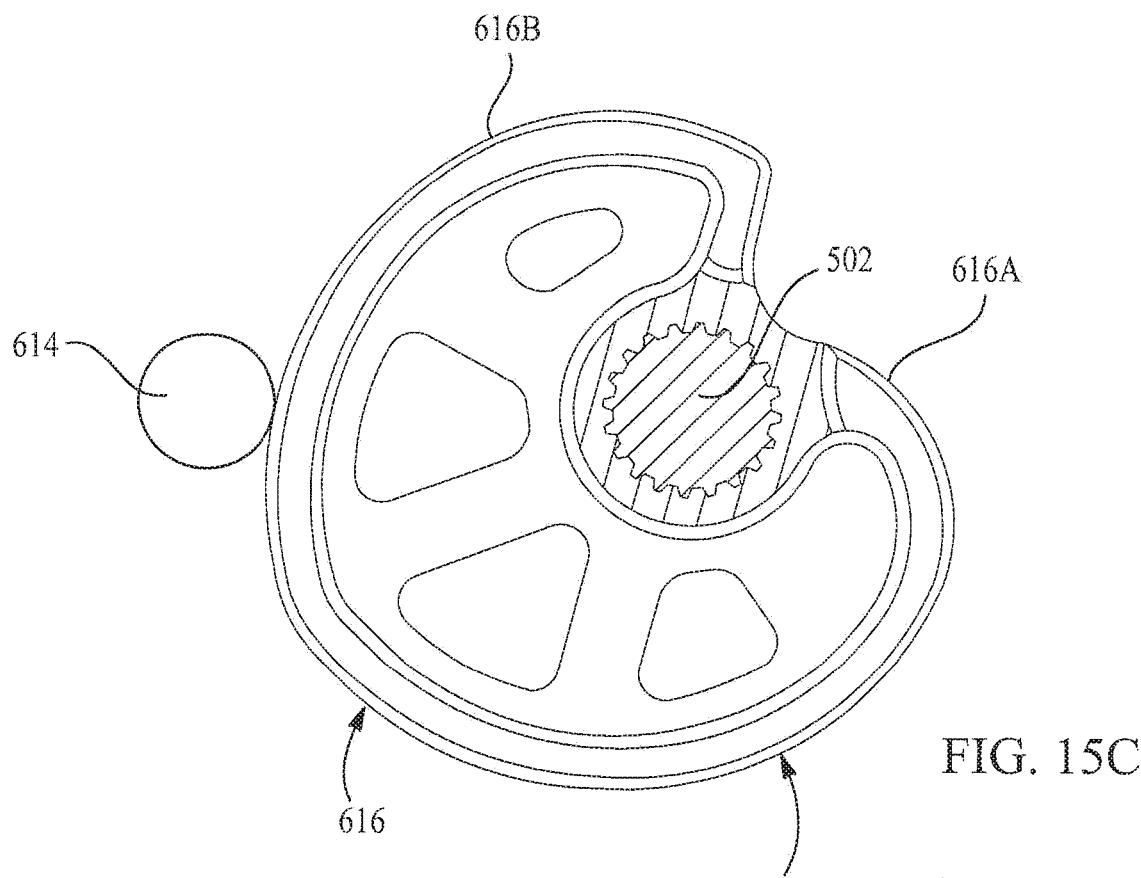

The limits of adaptive control in the on-demand four-wheel high-range drive mode are established by controlling bi-directional rotation of actuator shaft 502 between its ADAPT-H position of FIG. 15B and its "LOCK-H" position shown in FIG. 15C. With actuator shaft 502 in its LOCK-H position, second segment 616B of mode cam surface 616 causes second cam member 570 to move to its extended position, thereby causing pressure plate 466 to move to its fully engaged position for fully engaging mode clutch 450. This range of angular travel of actuator shaft 502 causes follower pin 534 to travel within high-range dwell segment 536 of range guide slot 532 so as to maintain range collar 440 in its (H) range position. However, such rotation of actuator shaft 502 results in mode follower 614 riding along second segment 616B of cam surface 616 which, in turn, is configured to control angular movement of second cam member 570 between its ready position and its extended position. Bi-directional rotation of actuator shaft 502 within this range of travel is controlled by ECU 56 actuating electric motor 500 based on a pre-selected torque control strategy. As will be understood, any control strategy known in the art for adaptively controlling torque transfer across mode clutch 450 can be utilized with the present invention.

If the vehicle operator selects the part-time four-wheel high-range drive (4HI) mode, electric motor 500 is energized to rotate actuator shaft 502 in the first direction to its LOCK-H position shown in FIG. 15C. As such, range collar 440 is maintained in its (H) range position and mode cam 614 causes second cam member 570 to move to its extended position which, in turn, moves pressure plate 466 to its fully engaged position for fully engaging mode clutch 450. To limit the on-time service requirements of electric motor 500, a power-off brake 640 associated with electric motor 500 can be engaged to brake rotation of the motor output so as to prevent back-driving of geartrain 506 and for holding pressure plate 466 in its fully engaged position. In this manner, electric motor 500 can be shut-off after the part-time four-wheel high-range drive mode has been established.

Figure 15D:
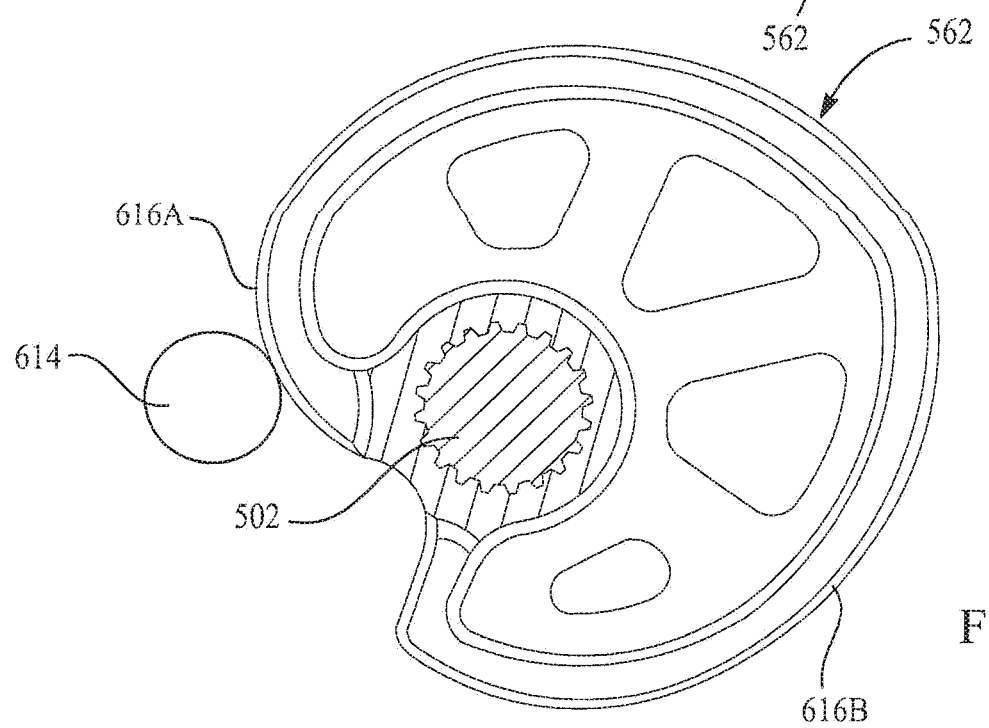

If the Neutral mode is selected, electric motor 500 is energized to rotate actuator shaft 502 in a second (i.e., counterclockwise) direction to the Neutral position shown in FIG. 15D. Such rotation of actuator shaft 502 causes follower pin 534 to exit high-range dwell segment 536 and ride within shift segment 540 of range guide slot 532 until range collar 440 is located in its (N) position. Concurrently, rotation of mode cam 562 causes mode follower 614 to engage a portion of first segment 616A of cam surface 616 that is configured to move second cam member 570 to a position displaced from its retracted position. Such movement of second cam member 570 results in limited axial movement of pressure plate 466 from its fully released position toward clutch pack 456. Preferably, such movement of pressure plate 466 does not result in any drive torque being transferred through mode clutch 450 to front driveline 18.

Figure 15E:
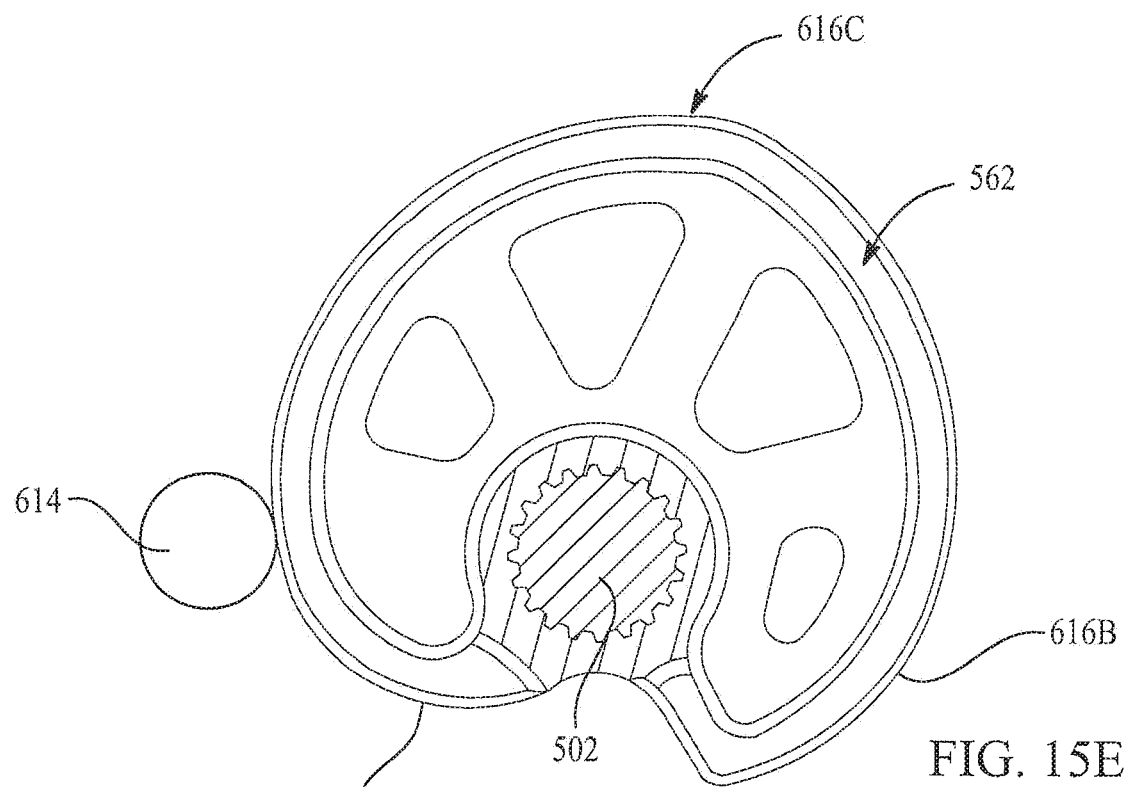
Figure 15F:
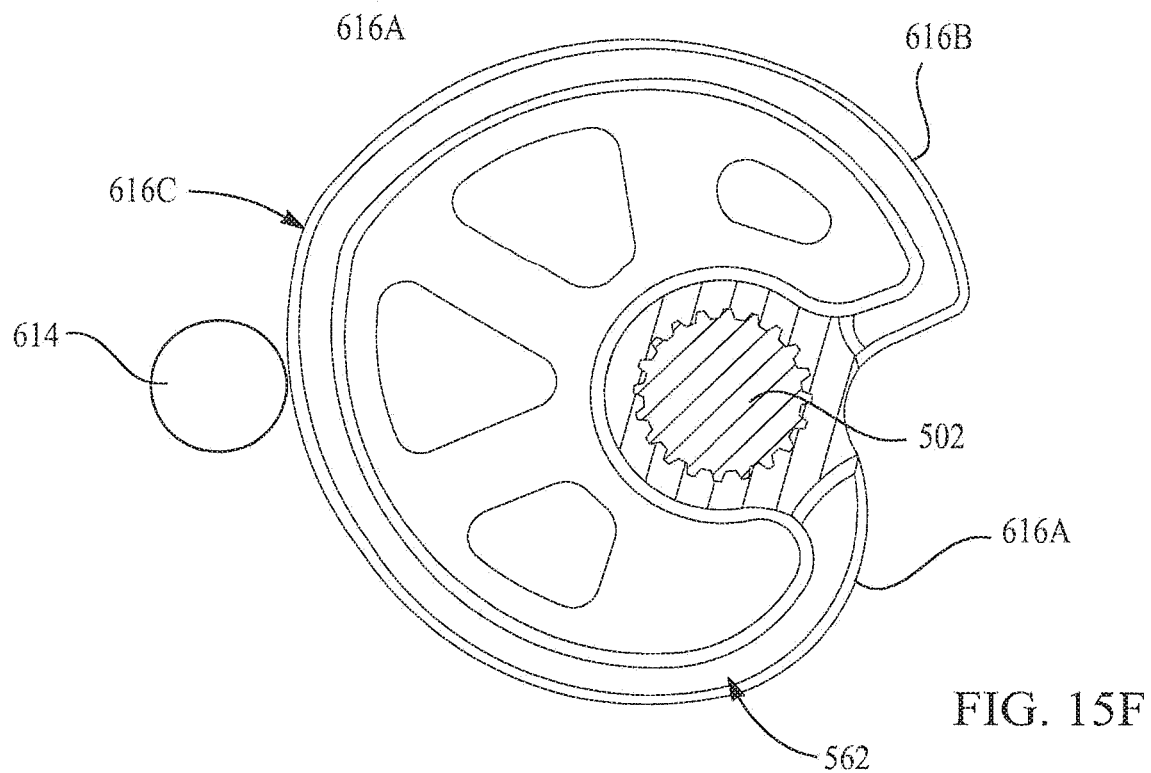

FIGS. 15E and 15F illustrate continued rotation of actuator shaft 502 in the second direction which occurs when the part-time four-wheel low-range drive (4LO) mode is selected. In particular, FIG. 15E shows an intermediate "ADAPT-L" position of actuator shaft 502 whereat range pin 534 enters low-range dwell segment 538 of range guide slot 532 for locating range collar 440 in its (L) range position. Mode cam 562 has likewise been rotated for locating mode follower 614 at the interface between first segment 616A of cam surface 616 and a third segment 616C thereof. The contour of third segment 616C is configured such that second cam member 570 will be rotated to its ready position when mode follower 614 is in the position shown. As previously noted, movement of second cam member 570 to its ready position causes pressure plate 466 to move axially to its adapt position. However, selection of the part-time four-wheel low-range drive mode causes continued rotation of actuator shaft 502 to its LOCK-L position shown in FIG. 15F. Low-range dwell segment 538 in range guide slot 532 maintains range collar 440 in its L range position while third segment 616C of mode cam surface 616 causes mode follower 614 to move second cam member 570 to its extended position, thereby moving pressure plate 466 to its fully engaged position for fully engaging mode clutch 450. Again, power-off brake 640 can be actuated to maintain actuator shaft 502 in its LOCK-L position.

Based on the specific arrangement disclosed for power-operated shift actuator unit 418, actuator shaft 502 is rotatable through a first range of angular travel to accommodate range shifting of range collar 440 as well as second and third ranges of angular travel to accommodate engagement of mode clutch 450. In particular, the first range of angular travel for actuator shaft 502 is established between its ADAPT-H and ADAPT-L positions. The second range of travel for actuator shaft 502 is defined between its ADAPT-H and LOCK-H positions to permit adaptive control of mode clutch 450 with range collar 440 in the (H) range position. Likewise, the third range of actuator shaft travel is defined between its ADAPT-L and LOCK-L positions to permit actuation of mode clutch 450 while range collar 440 is in its (L) range position. In the construction shown, power-operated clutch actuation unit 438 utilizes a single powered device (i.e., electric motor 500) to control actuation of both range shift mechanism 408 and mode shift mechanism 416.

Figure 9:
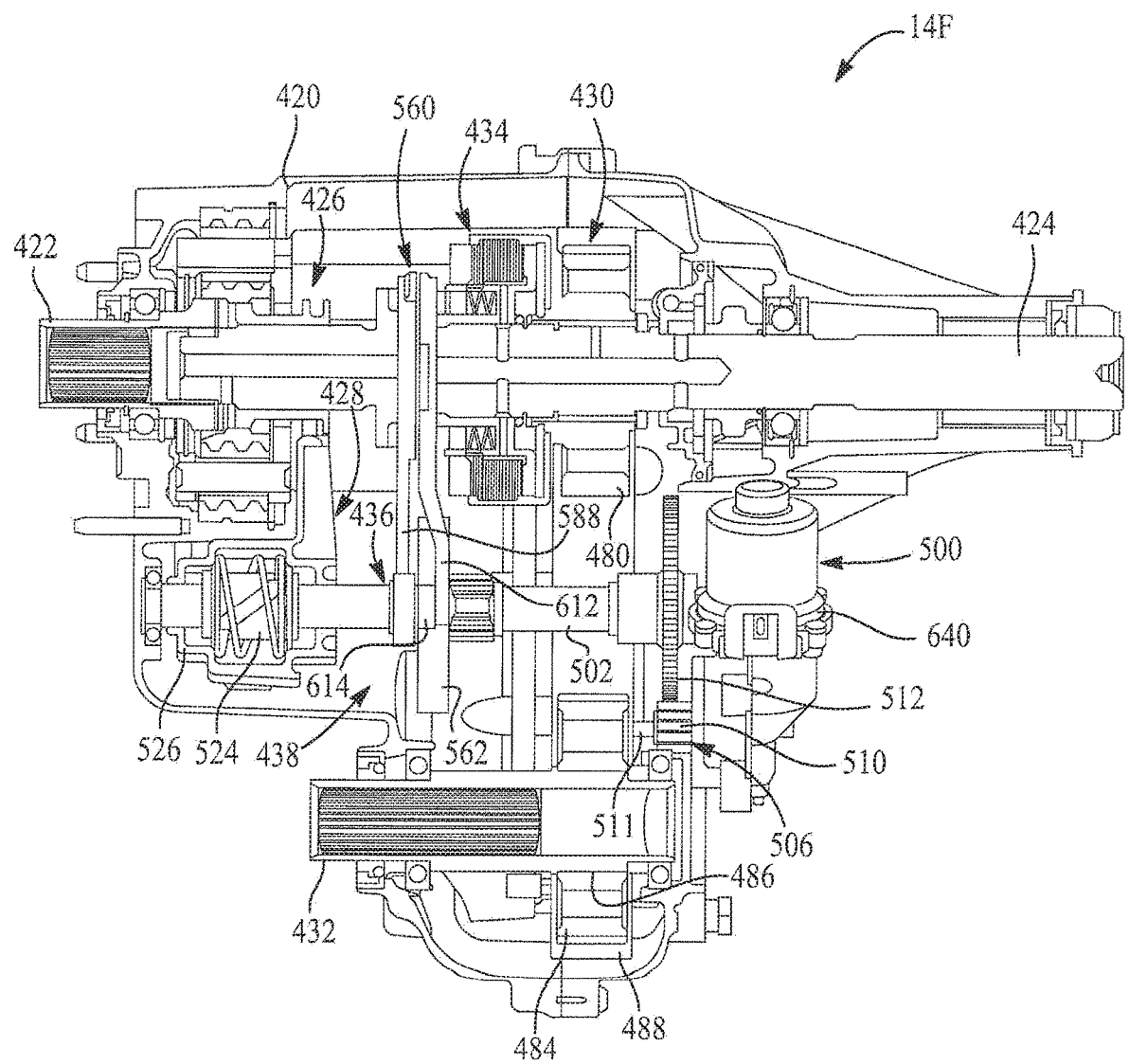
FIG. 9 is a sectional view of a two-speed active transfer case constructed in accordance with a sixth embodiment.

As previously noted, sector plates 154 (FIG. 4), 154' (FIG. 6), range cam 372 (FIG. 8) and range cam 524 (FIG. 9) are each operable as a "rotary-to-linear" conversion device configured to convert input torque from the power-operated shift actuator into an axially-directed shift force used to axially move the range clutch between its distinct range positions. In each instance, this conversion device included a range guide slot configured to have a first (high-range) dwell segment and a second (low-range) dwell segment interconnected via a third (range shift) segment. In conventional two-speed transfer case range shift arrangements, the range shift segment of the range guide slot associated with the conversion device has a linear, single-rate camming profile. One example of this arrangement is shown in FIGS. 18 and 18A in which a single rate ("single step") range cam "RC" includes a range guide slot "GS" adapted to retain the range pin therein. The range guide slot (GS) is configured to include a high-range dwell ("HRD") segment, a low-range dwell ("LRD") segment, and an intermediate range shift ("RS") segment. With respect to 360° of angular travel, this range cam (RC) is shown in this non-limiting embodiment, with the high-range dwell (HRD) segment extending 170°, the range shift (RS) segment extending 70°, and the low-range dwell (LRD) segment extending 110°. In this arrangement, 70° of rotation of the range cam (RC) is used for moving the range clutch between its high-range and low-range positions. As can be seen best in FIG. 18A, range shift segment (RS) has one continuous camming (single-rate) profile, identified by angle "A". Range cam (RC) shown in FIG. 18 is shown with internal splines for common rotation with actuator shaft 502 associated with transfer case 14F of FIGS. 16 and 17. However, a non-splined version of range cam (RC) could be used in association with any of the previously disclosed transfer cases 14E (FIG. 8) and 14F (FIG. 9).

Figure 18:
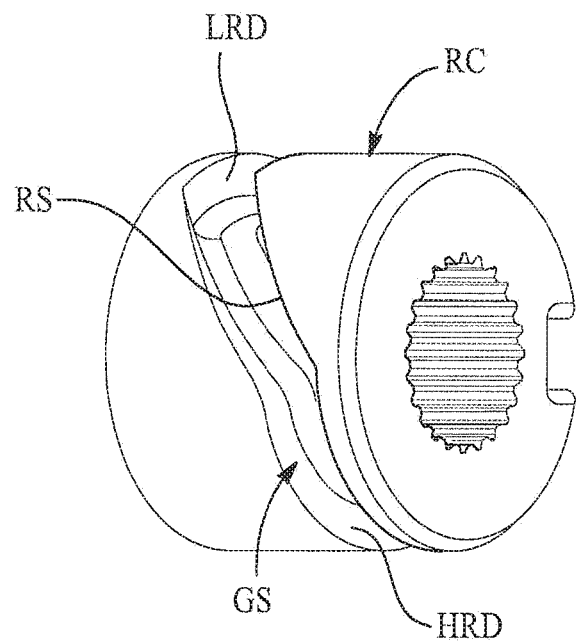
FIG. 18 is a perspective view of a range cam and FIG. 18A is an "unrolled" view of the range cam illustrating a guide slot having a low-range dwell segment interconnected to a high-range dwell segment via a linear (single rate) range shift segment.
Figure 18A:
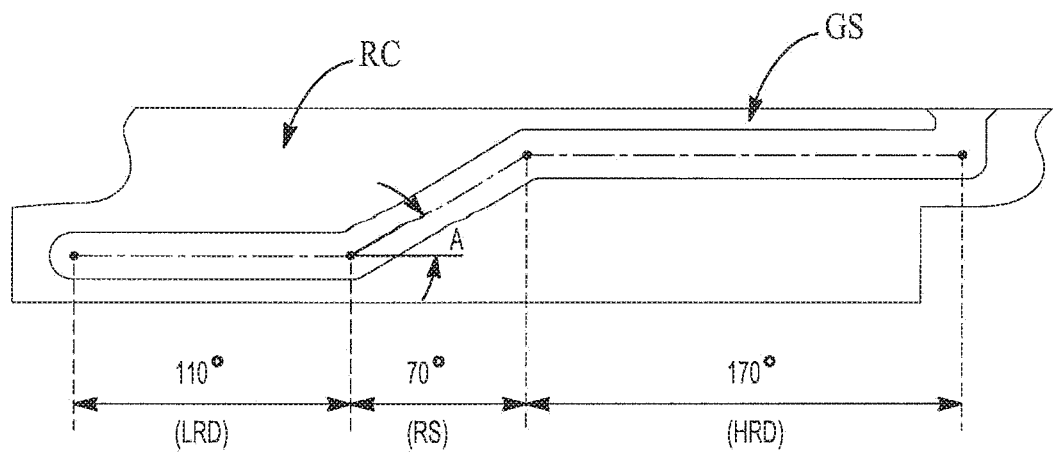
Figure 19:
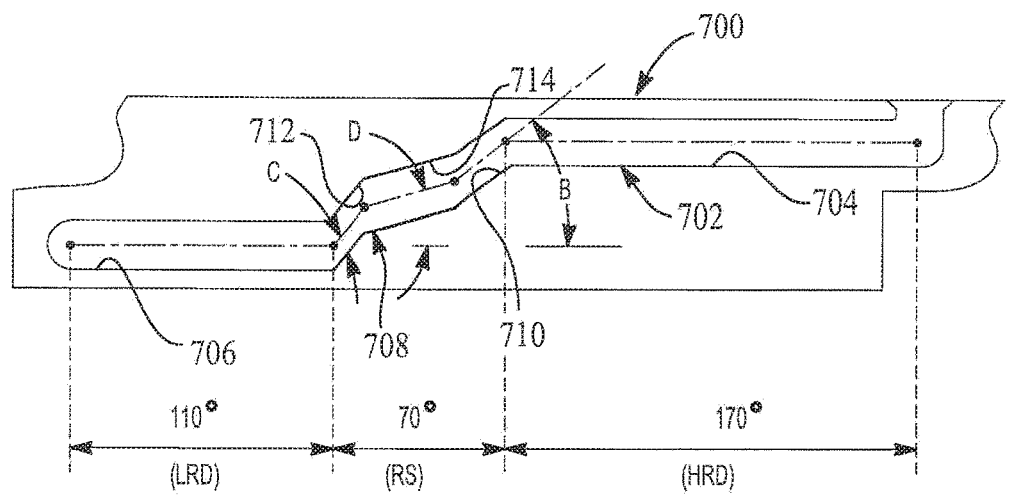
FIG. 19 is an unrolled view of a range cam embodying the teachings of the present disclosure and including a guide slot having a non-linear, multi-step (multi-rate) range shift segment.

In contrast to this arrangement, the rotary-to-linear conversion devices of the present disclosure may be configured to include a range guide slot having a range shift segment defining a multi-step (multi-rate) camming profile for generating optimized axially-directed shift forces. Accordingly, a non-limiting embodiment of a range cam 700 is shown in FIG. 19 to be a modified version of range cam (RC) of FIGS. 18 and 18A. Specifically, range cam 700 is formed to include a range guide slot 702 having a high-range dwell segment 704, a low-range dwell segment 706, and a multi-step range shift segment 708. Multi-step range shift segment 708 of range guide slot 702 is shown to include a plurality of distinct camming profiles which, in this non-limiting version, are comprised of a first (high-range) cam portion 710, a second (low-range) cam portion 712, and a third (central) cam portion 714 interconnecting first cam portion 710 and second cam portion 712. It should be noted that these three (3) distinct cam portions are still provided within the 70° range shift segment 708 while range guide slot 702 also still includes a 170° high-range dwell segment 704 and a 110° low-range dwell segment 706. As such, range cam 700 can be directly substituted for range cam (RC) without tear up of an otherwise conventional range shift system and yet functions to generate more axial force without increasing the rotational input torque requirements. Further, this multi-step configuration is configured to increase the shift forces only at times during the range shift operation in which greater shift forces are required and to decrease the shift forces at those times during the range shift operation in which less shift forces are required.

Figure 20:
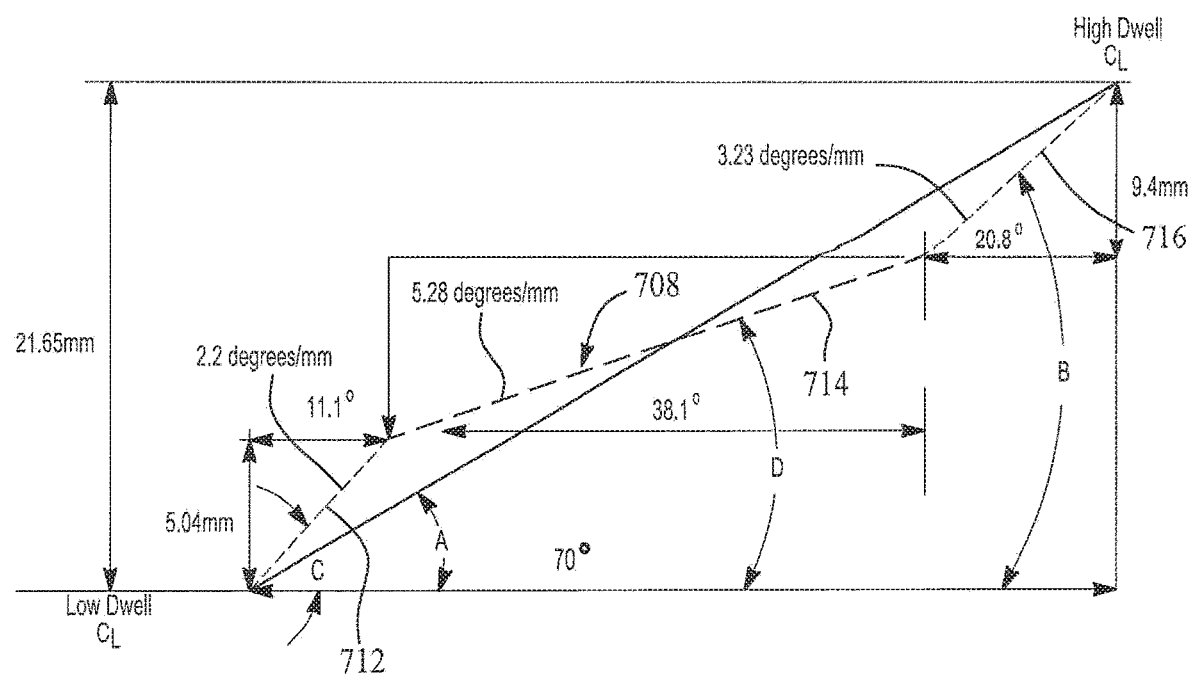
FIG. 20 is an overlay comparison of the multi-step range cam of the present disclosure compared to a single-step range cam.

With continued reference to FIG. 19, range shift segment 708 of guide slot 702 is shown with first cam portion 710 defining a first angle "B", second cam portion 712 defining a second angle "C", and third cam portion 714 defining a third angle "D". FIG. 20 illustrates a layover comparison of shift segment 708 of range cam 700 to the range shift segment of range cam (RC). As seen, high-range cam portion 710 extends 20.8°, low-range cam portion 712 extends 11.1° and central cam portion 714 extends 38.1° to define the total 70° of angular travel associated with multi-step range shift segment 708. Also to be recognized is that angles B and C are greater than angle A (FIG. 18A), while angle D is less than angle A. Thus, three distinct camming portions or "shift phases" are established when range cam 700 is rotated to move the range clutch between its high-range and low-range positions. As understood, range cam 700 can be axially moveable when used in associations with transfer cases 14E (FIG. 8) and 14F (FIG. 9) in response to engagement of follower 384, 534 within the range guide slot due to rotation of actuator shaft. Alternatively, range cam 700 can be fixed for rotation with actuator shaft (FIGS. 16-17).

Figure 17:
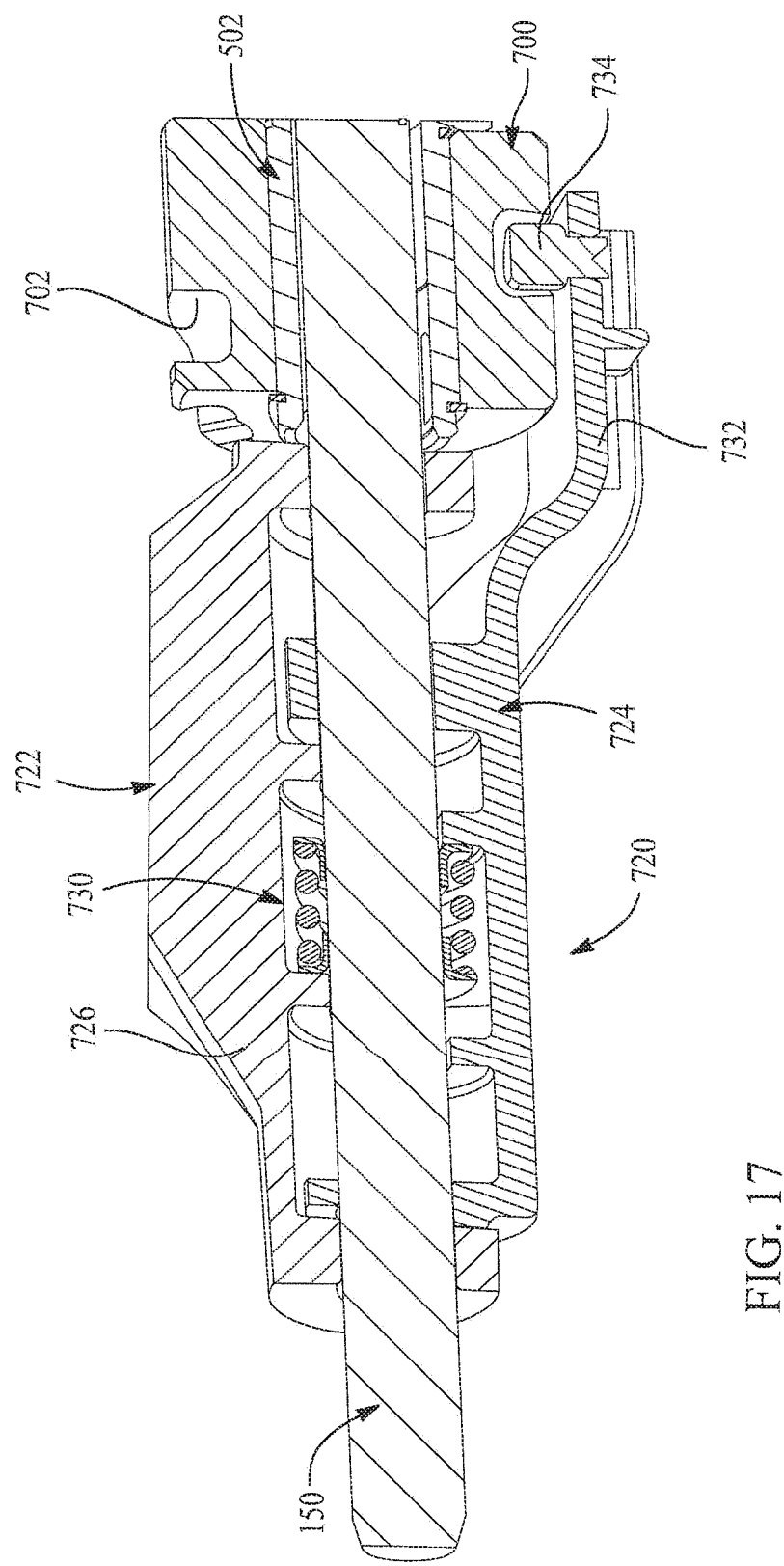
FIG. 17 is an enlarged partial view showing portions of the range cam and the range fork associated with the range shift mechanism of FIG. 16.

FIGS. 16 and 17 illustrate another non-limiting arrangement of a range mechanism 426 and a range shift mechanism 428 adapted for use with any of the two-speed transfer case previously disclosed, and particularly transfer case 14F of FIGS. 9 through 12. In this arrangement, range cam 700 is fixed for rotation with actuator shaft 502. Actuator shaft 502 is shown surrounding and rotatably supported on shift rail 150. A two-piece range fork unit 720 includes range fork 722 and a slider bracket 724. Range fork 722 includes a cylindrical hub segment 726 and a fork segment 728 coupled to range collar 440. A spring-load mechanism 730 is disposed between slider bracket 724 and hub segment 726 of range fork 722. Slider bracket 724 includes an extension 732 having a range pin 734 located to extend into range guide slot 702 of range cam 700. Upon rotation of actuator shaft 502, range cam 700 is currently driven such that locations of range pin 734 within guide slot 702 functions to control axial movement of range fork unit 720 relative to shift rail 150 for controlling movement of range collar 440 between its three distinct range positions with respect to planetary gearset 116'. As previously noted, range shift segment 708 of guide slot 702 is configured in a multi-step arrangement for varying the shift force applied to range collar 440 when shifting between its (L) range and (H) range positions.

Figure 21:
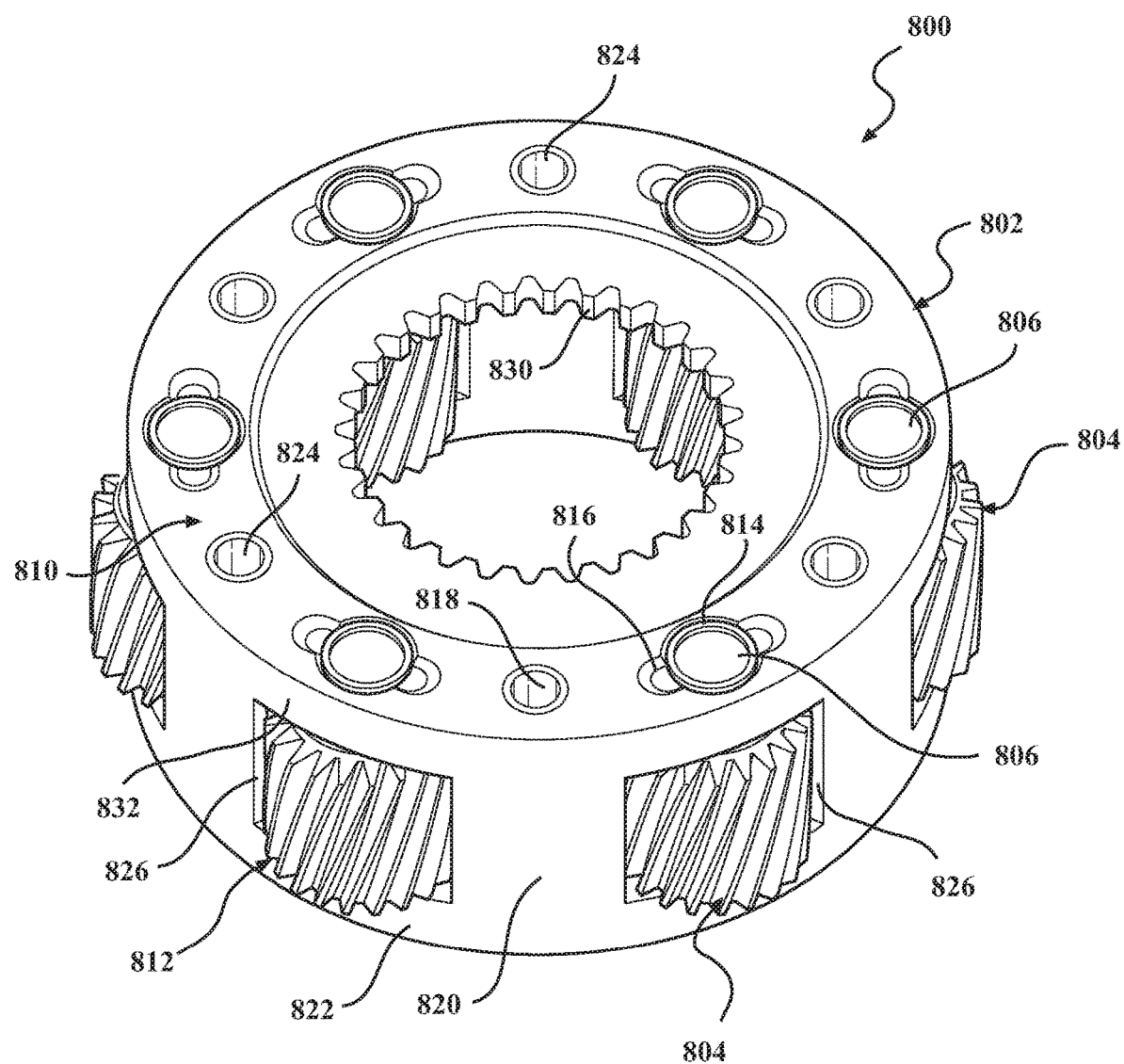
FIG. 21 is a perspective view of a planetary gearset equipped with a conventional carrier unit.

In each of the transfer case embodiments disclosed herein, the two-speed range mechanism included a planetary gearset comprised of a sun gear, a ring gear, a carrier unit, and a plurality of planet gears rotatably supported by the carrier unit and in constant mesh with the sun and ring gears. Obviously, other versions/types of planetary gearset arrangements can be used without deviating from the following discussion relating to integration of a "crack arresting" feature into the carrier unit. In this regard, FIG. 21 illustrates a planet carrier assembly 800 having a carrier unit 802 and planet gears 804 rotatably supported on pinion posts 806. As previously disclosed, planet gears 804 would be in constant meshed engagement with a sun gear and a ring gear to cause carrier unit 802 to be driven at a reduced speed relative to the sun gear.

Thus, when the carrier unit 802 is engaged with the output shaft to drive the output shaft, the output shaft will rotate at a reduced speed relative to the input shaft and the sun gear.

Carrier unit 802 is shown, in this non-limiting arrangement, to include a carrier ring 810 and a carrier hub 812. Carrier ring 810 is formed to include a plurality of equidistant and circumferentially-aligned post holes 814 through which the end of pinion posts 806 extend. Indentations 816 extend from post holes 814 to permit the end of each pinion post 806 to be swaged or otherwise deformed to secure posts 806 to carrier ring 810.

Disposed between each post hole 814, carrier ring 810 also includes mounting holes 818 which are configured to align with similar mounting holes (not shown) formed in axially-extend web segments 820 of carrier hub 812. Web segments 820 extend from a plate segment 822 of carrier hub 812. Mounting pins 824 are press-fit into the aligned mounting holes 818 to rigidly secure carrier ring 810 to web segments 822 of carrier hub 812.

Obviously, alternative methods can be used to rigidly fix carrier ring 810 and carrier hub 812 together. Additionally, as described above, the carrier 802 may also be formed in other ways in which a pair of plates are spaced apart and which support the posts 806 on which planet gears 804 may rotate. In another aspect, the structure of the carrier 802 that supports the posts may be formed as a one-piece member, such as via sintering or the like. For the purposes of discussion, the carrier 802 will be discussed as illustrated, in which the carrier ring 810 is secured to the carrier hub 812.

Windows 826 are formed between adjacent web segment 822 and between carrier ring 810 and plate segment 822. Planet gears 804 are located within windows 826. Carrier ring 810 also includes clutch teeth 830. As shown, clutch teeth 822 are in the form of internal teeth. As previously noted, clutch teeth 830 on carrier unit 802 are provided to selectively engage external clutch teeth on the range collar when the four-wheel low-range drive mode is established. When the external clutch teeth of the range collar engage with the clutch teeth 830 of the carrier 802, the rotation and torque of the carrier 802 will drive the output shaft. When the clutch teeth 830 of the carrier 802 are not engaged with the external clutch teeth of the range collar, the carrier 802 may still rotate in accordance with the rotation of the sun gear and planet gears, but the rotation of the carrier 802 will not be transferred to the output shaft, which will instead operate in neutral or be rotated along with the input shaft, depending on the position of the range collar, as described above.

Figure 22:
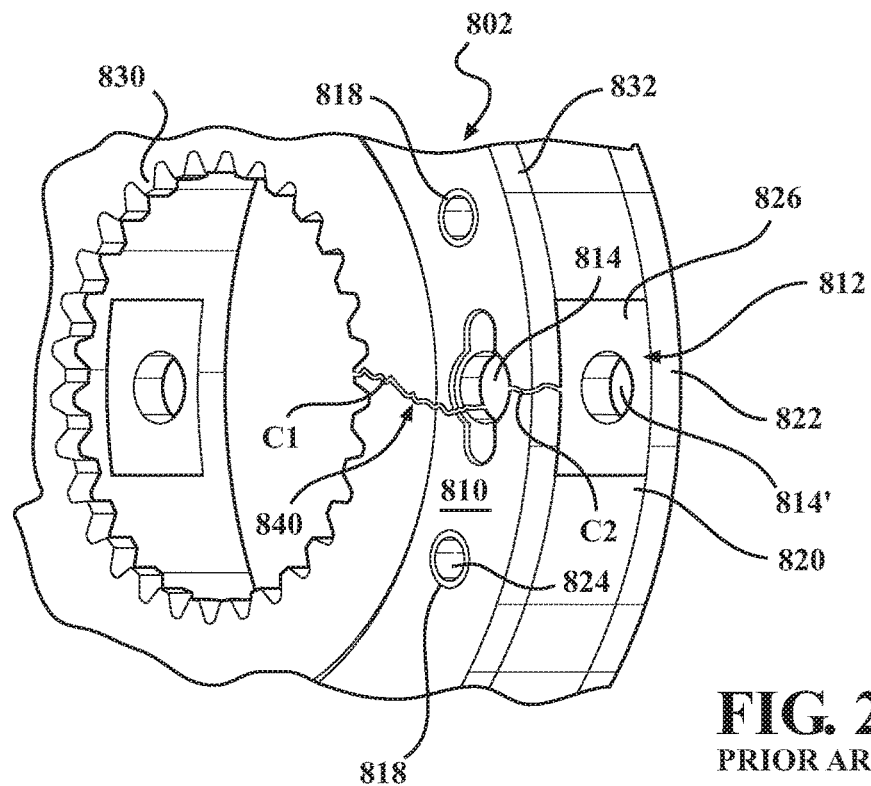
FIG. 22 is a perspective view of the carrier unit shown in FIG. 21 illustrating a crack failure due to a stress crack propagating from the spline/clutch teeth to the pinion shaft bore and through the OD of the carrier unit.

FIG. 22 illustrates a crack failure of carrier unit 802 due to a crack 840 which originated at one of clutch teeth 830 and propagated through mounting hole 814 to the OD of carrier ring 810. Such a crack 840 may result from fatigue stress generated during low-range operation when the most stress is placed on carrier unit 802. The added stress during this low-range operation may result from the carrier unit 802 being used to drive the output shaft and reaction forces imparted on the teeth 830.

As shown, crack 840 has a first portion "$C^1$" extending from one of clutch teeth 830 to mounting hole 814 and a second portion "$C^2$" extending from mounting hole 814 to a peripheral edge surface 832 of carrier ring 810.

To address and overcome such crack failure incidents, the present disclosure is directed to integrating a "crack arresting" feature into carrier ring 810 of carrier unit 802. Thus, while a crack may be still produced on the carrier unit 802, such as a crack propagating from the teeth 830, such a crack may be limited in the degree to which it can propagate toward the mounting hole 814 and/or the outer peripheral edge 832.

Figure 25:
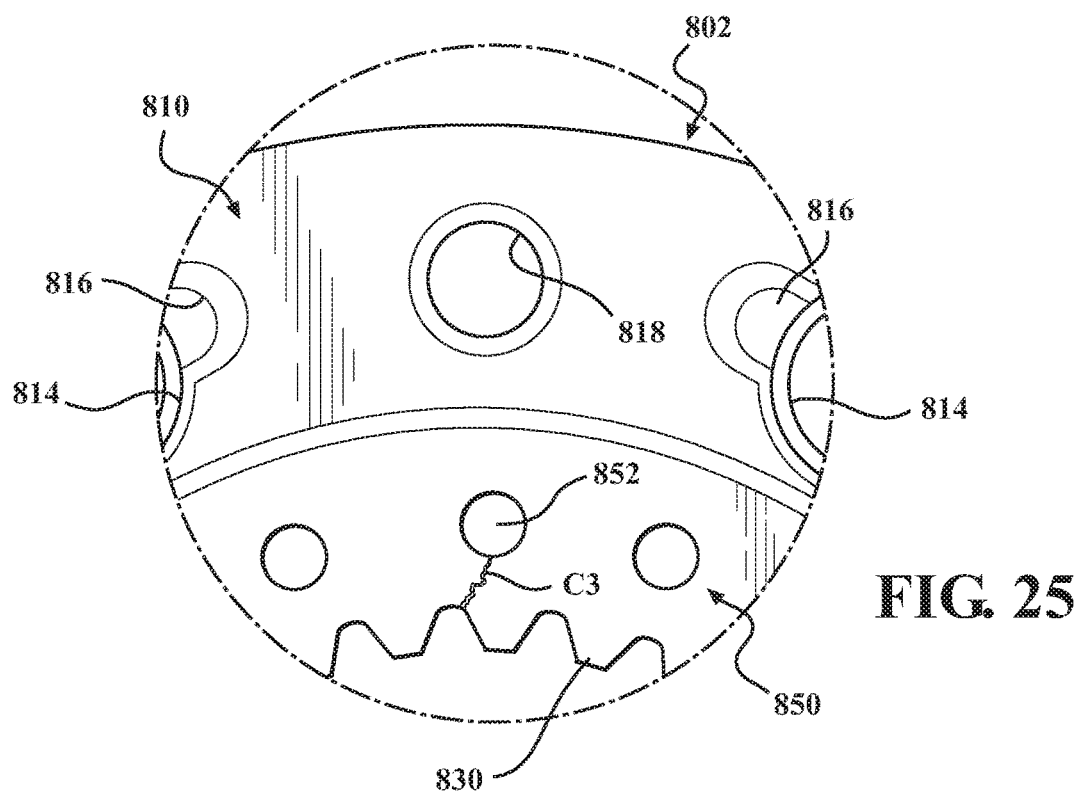
FIG. 25 is similar to FIG. 24 but now shows a crack failure propagated from the spline/clutch teeth to the crack arresting feature.
Figure 23:
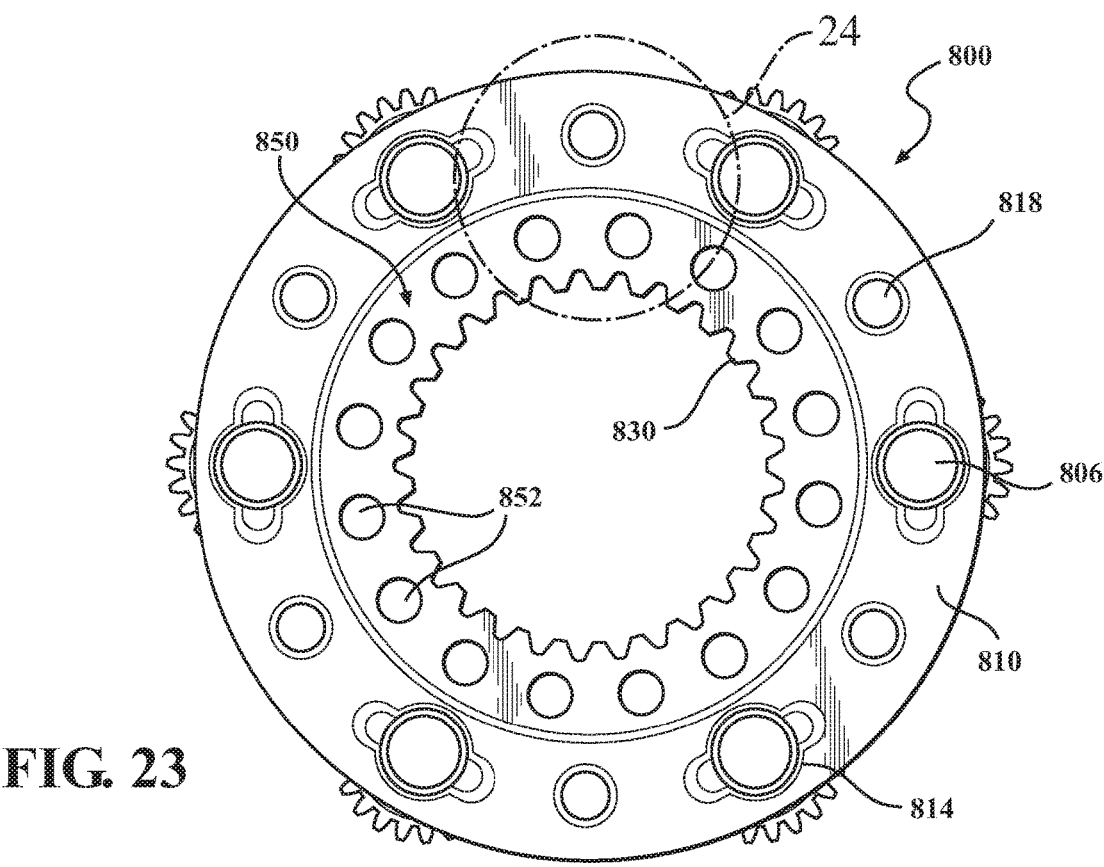
FIG. 23 is a side view of a planetary gearset having a carrier unit configured to include a crack arresting feature according to a first non-limiting embodiment.
Figure 24:
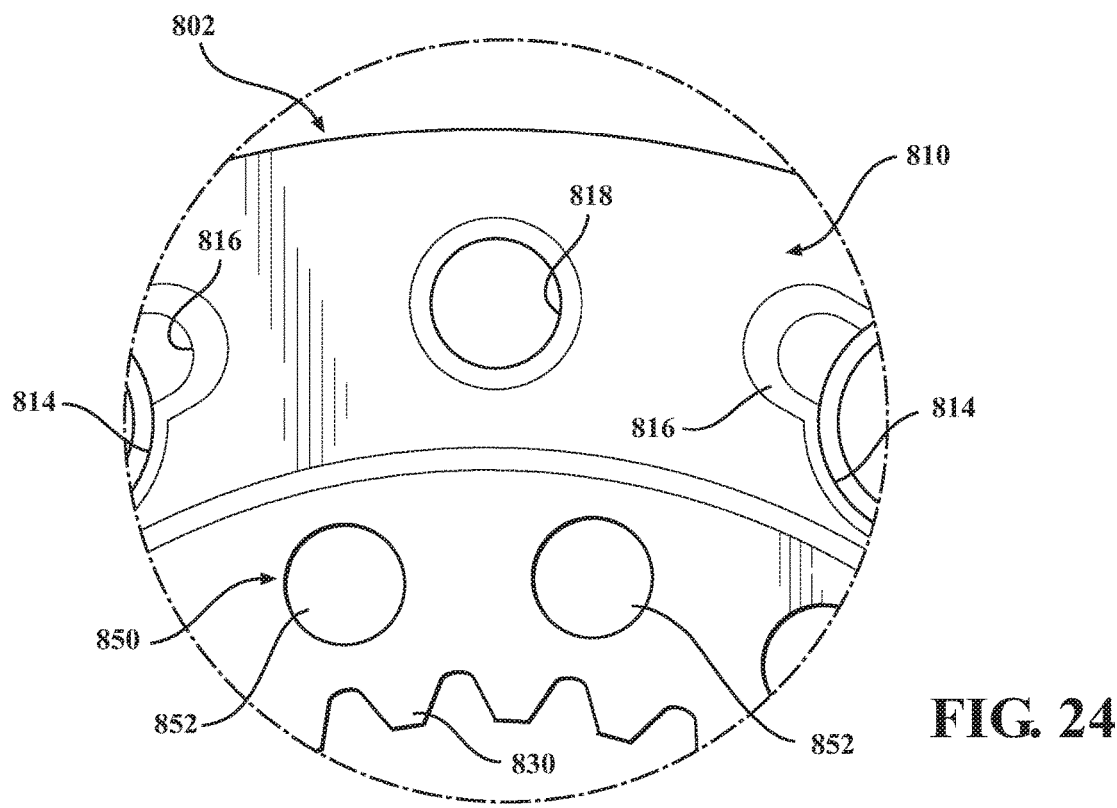
FIG. 24 is an enlarged partial view of the carrier unit shown in FIG. 23 for providing additional clarity regarding the crack arresting feature associated therewith.

FIGS. 23-25 illustrate carrier ring 810 modified to include a plurality of crack mitigating apertures 850 in general proximity to clutch teeth 830 and which provide a first non-limiting embodiment of the crack arresting feature. In particular, apertures 850 may be through and/or partial depth holes or bores 852 (hereinafter referred to as bores 852, but it will be appreciated that reference to the bores 852 may refer to both through and partial depth holes/bores) positioned at a diameter from the center of carrier ring 810 and are located between clutch teeth 830 and pinion post holes 814. The diameter from the center of the carrier ring 810 on which the bores 852 are disposed is a diameter that is greater than the diameter of the clutch teeth 830 and less that the diameter on which the mounting holes 814 are centered.

As shown, crack mitigating bores 852 are circumferentially-aligned along a common diameter and are equally-spaced apart. In another aspect, the bores 852 may be spaced apart in an unequal fashion, with the space between a pair of adjacent bores 852 being smaller or larger than the spacing from the next circumferentially adjacent bore 852. The number of bores 852, their size and depth, and their spacing can be selected to best address each specific application and use environment for providing optimized crack mitigation.

As shown in FIG. 23, there are a greater number of bores 852 (sixteen) than there are mounting holes 814 (six). The bores 852 are also shown as being smaller in individual diameter than the diameter of the mounting holes. However, it will be appreciated that the number of bores 852 may be the same or less than the number of mounting holes 814, depending on the overall size and shape of the carrier unit 802, the size and number of posts 806 and planet gears 804, etc. The size of the bores 852 may also be the same as or greater than the size of the mounting holes 814 or posts 806.

The inclusion of the bores 852 provides for a crack-arresting feature of the carrier unit 802. FIG. 25 illustrates a crack "$C^3$" extending from one of clutch teeth 830 and terminating at one of crack mitigating bores 852, but not propagating any further in a radial outward direction. Thus, the strength and rigidity of carrier unit 802 will not be further reduced, thereby allowing continued operation of transfer case 14 and extending its service life. It should be understood that crack mitigating bores 852 can be oriented to be aligned with either of pinion post holes 814 and/or mounting holes 818 or, in the alternative, configured in a staggered orientation therebetween.

Figure 26:
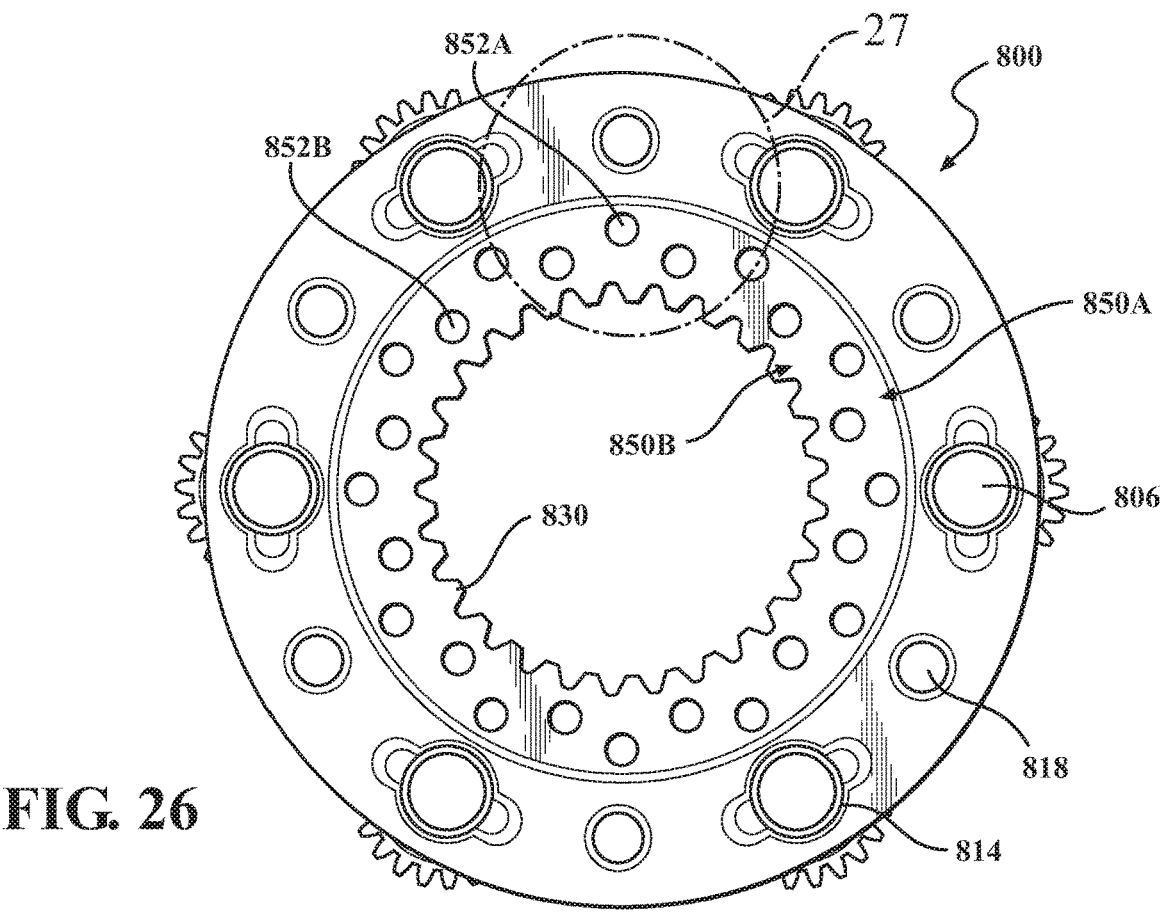
FIGS. 26 and 27 are generally similar to FIGS. 23 and 24, respectively, but illustrate the carrier unit configured to include a crack arresting feature according to a second non-limiting embodiment.
Figure 27:
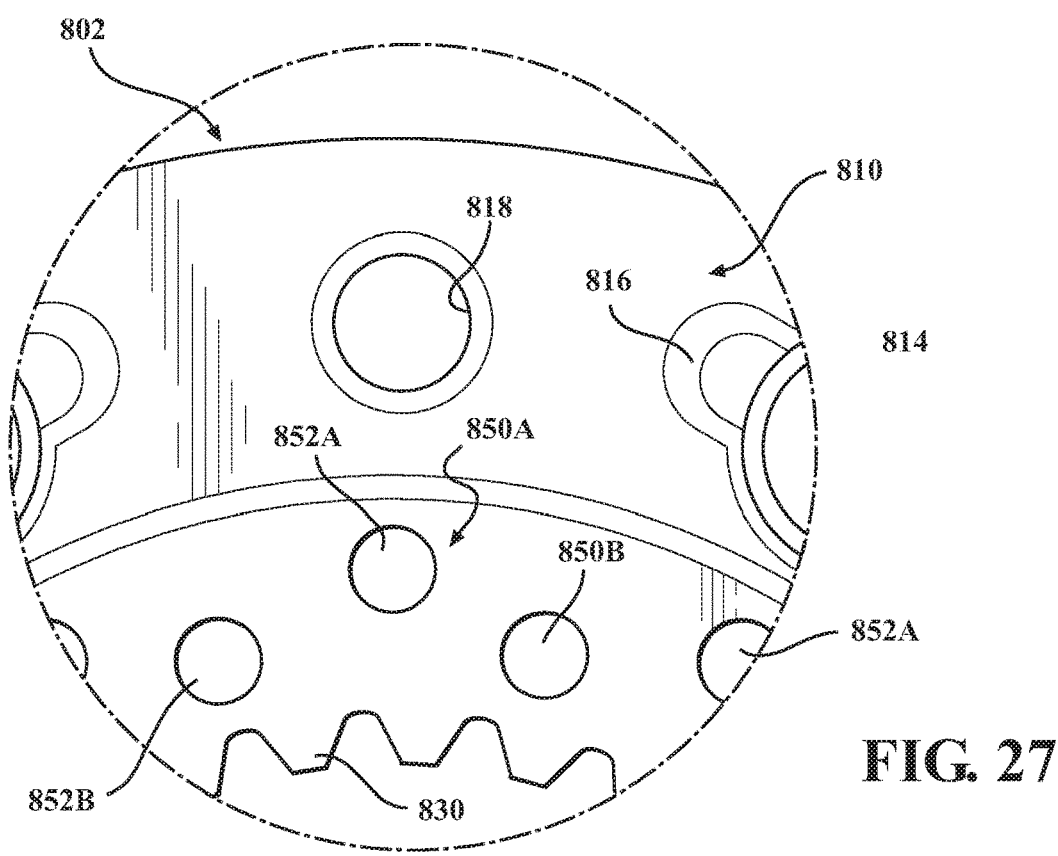

Referring now to FIGS. 26 and 27, an alternative configuration of the crack arresting feature is shown integrated into carrier ring 810 of carrier unit 802. In this regard, carrier ring 810 is shown to now include a first plurality of crack mitigating apertures 850A and a second plurality of crack mitigating apertures 850B which together define a second non-limiting embodiment of the crack arresting feature.

The first plurality of apertures 850A include a series of through and/or partial depth holes or bores 852A positioned at a first diameter from the center of carrier ring 810 while the second plurality of apertures 850B include a series of through and/or partial depth holes or bores 852B positioned at a second diameter from the center of carrier ring 810. As described previously, further reference to the bores 852A, 852B will be understood to encompass both partial depth bores and through-holes. The number and dimensions (i.e. diameter, depth, etc.) of first diameter bores 852A may be identical to or different from the number and dimensions of second diameter bores 852B based on determination of an optimized configuration to prevent propagation of a stress crack from clutch teeth 830 beyond first diameter bores 852A.

The first plurality of bores 852A may be centered on a diameter from the center of the carrier ring 810 that is greater than the diameter on which the second plurality of bores 852B are centered. Thus, in a direction from the center of the carrier ring 810 moving radially outward, the teeth 830 are followed by the second plurality of bores 852B, which are followed by the first plurality of bores 852A, which are followed by the mounting holes 814.

The first plurality of bores 852A may be evenly circumferentially spaced along the diameter on which they are centered. Alternatively, the first plurality of bores 852A may be un-evenly circumferentially spaced. The second plurality of bores 852B may likewise be evenly or unevenly spaced circumferentially along the diameter on which they are centered.

In one aspect, the first plurality of bores 852A and second plurality of bores 852B may be circumferentially staggered, such that each of the first plurality of bores 852A is disposed circumferentially between adjacent ones of the second plurality of bores 852B, when there are the same number of bores 852A and 852B. When there are a different number, some of the bores 852A may be circumferentially between some of the bores 852B, and others may be aligned. When circumferentially staggered, the circumferential spacing may be even between adjacent ones of the opposite set of bores 852A or 852B. Alternatively, staggering may be uneven relative to adjacent ones of the opposite set of bores, such that the distance to an adjacent bore in one direction is less than the distance to the adjacent bore in the opposite direction.

In yet another aspect, the bores 852A and 852B may be non-staggered, and instead be aligned in the same radial direction, such that they are not circumferentially offset or staggered. In this arrangement, the pairs of bores 852A and 852B bay be aligned with or offset from the mounting holes 814.

Figure 28:
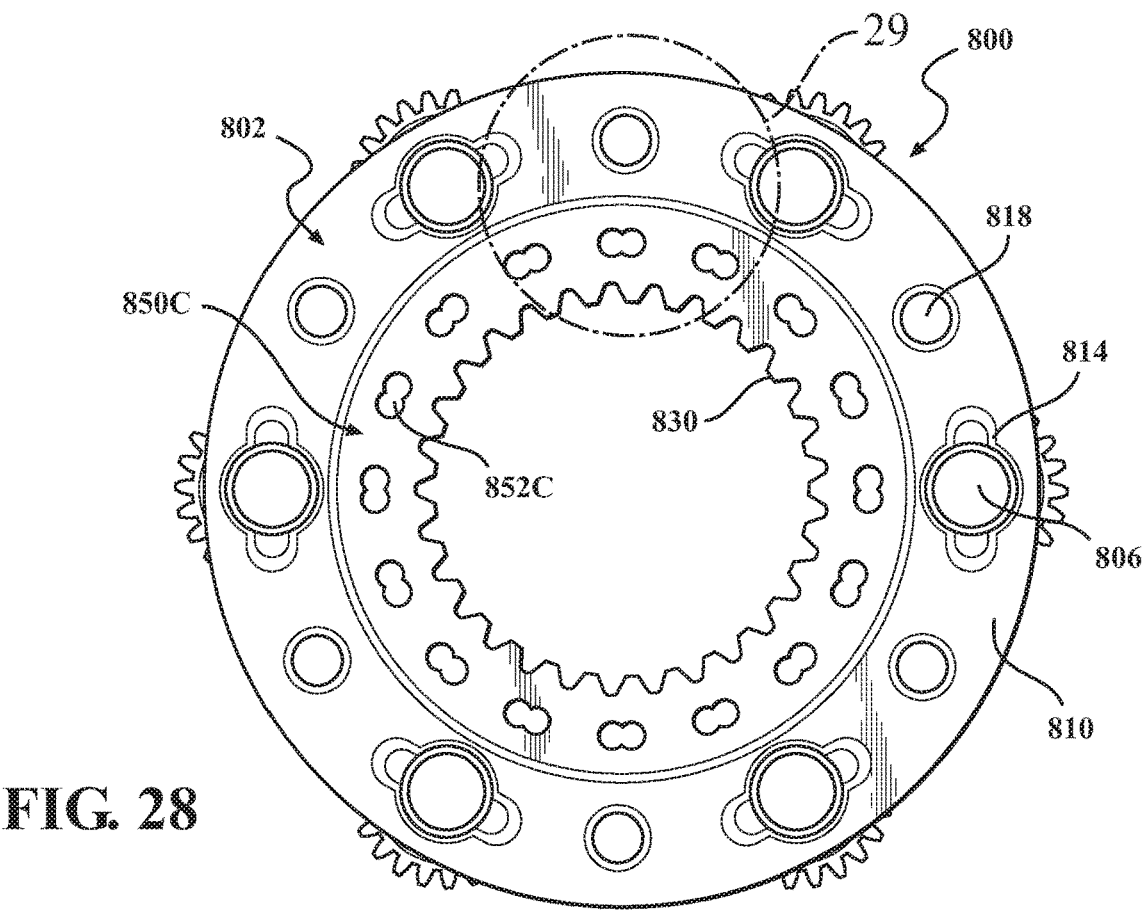
FIGS. 28 and 29 are provided to illustrate the carrier unit of the planetary gearset configured to include a crack arresting feature according to a third non-limiting embodiment.
Figure 29:
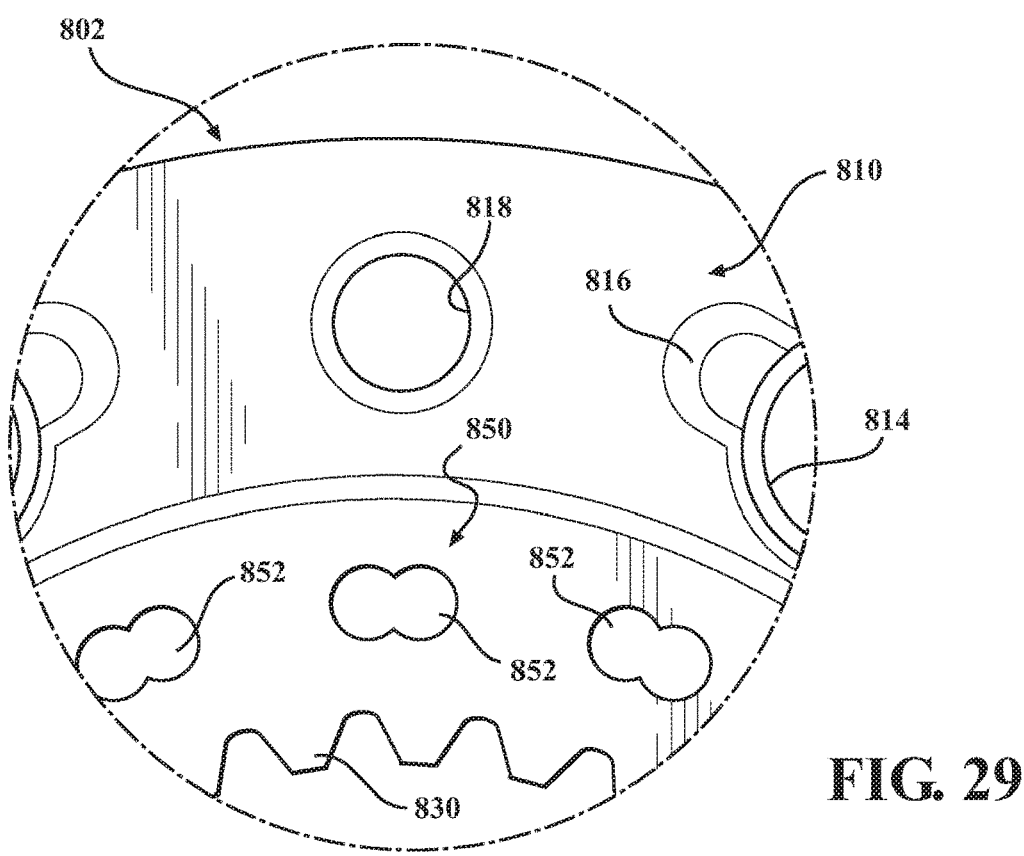

Referring now to FIGS. 28 and 29, another alternative configuration of the crack arresting feature is shown integrated into carrier ring 810 of carrier unit 802. In this regard, a carrier ring 810 is now shown modified to include a plurality of crack mitigating apertures 850C which provide a third non-limiting embodiment of the crack arresting feature. In particular, apertures 850C are configured as a plurality of circumferentially-aligned and equidistantly-spaced lobe-type holes or bores 852C, of through and/or partial depth, each comprising a first bore portion 854 intersecting with a second bore portion 856. Lobe-type bores 852C are shown aligned along a common diameter, but a staggered arrangement is also contemplated as being an alternative configuration. While the dimensions (i.e. size and depth) of first portion 854 and second portion 856 of lobe-type bores 852C are shown to be generally identical, it is understood that variations in such dimensions between such first and second portions of lobe-type bores 852C is likewise contemplated within the scope of this disclosure.

Similar to the above description of the bores 852, the circumferential spacing may also be uneven. The various alternative spacing and sizes described above with respect to the bores 852 may also be applied to the bores 852C.

Figure 30:
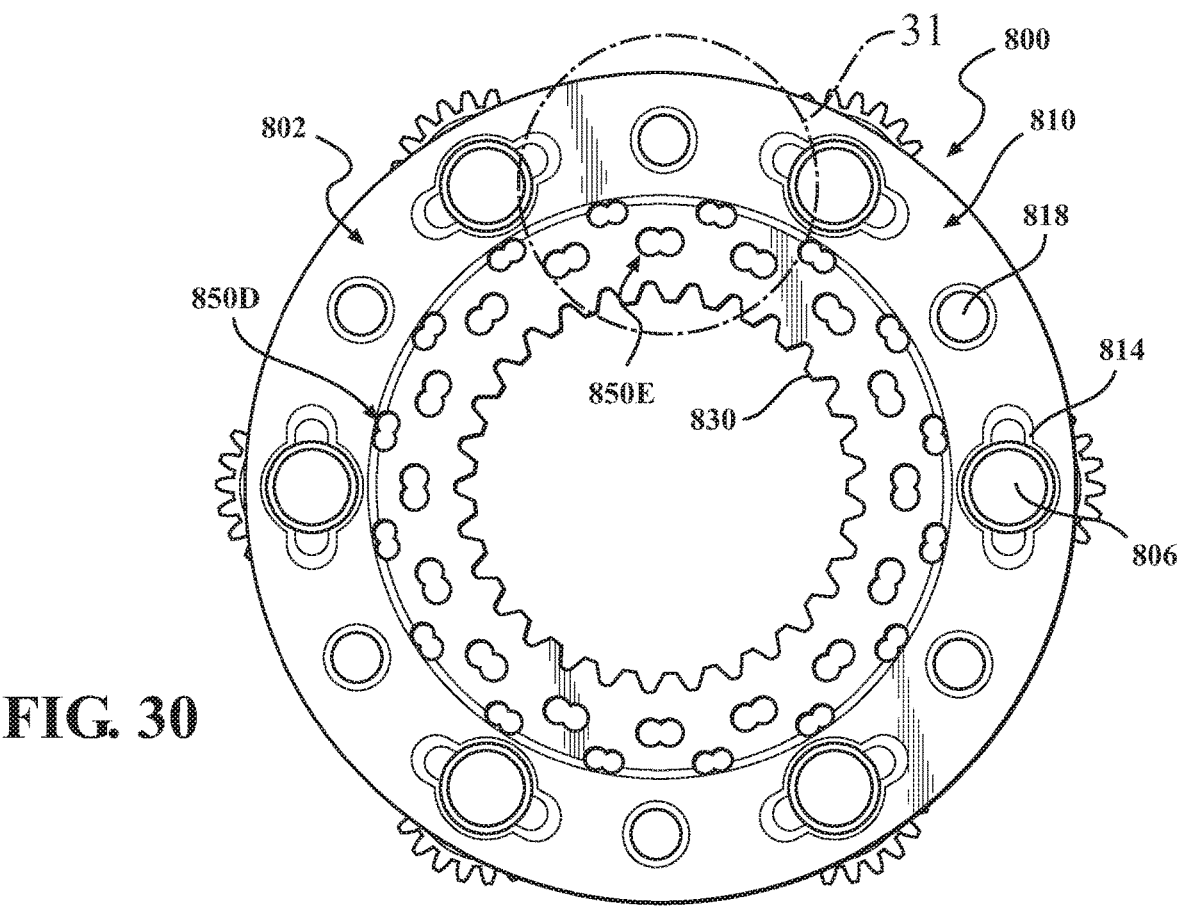
FIGS. 30 and 31 illustrate the carrier unit of the planetary gearset configured to include a crack arresting feature according to a fourth non-limiting embodiment.
Figure 31:
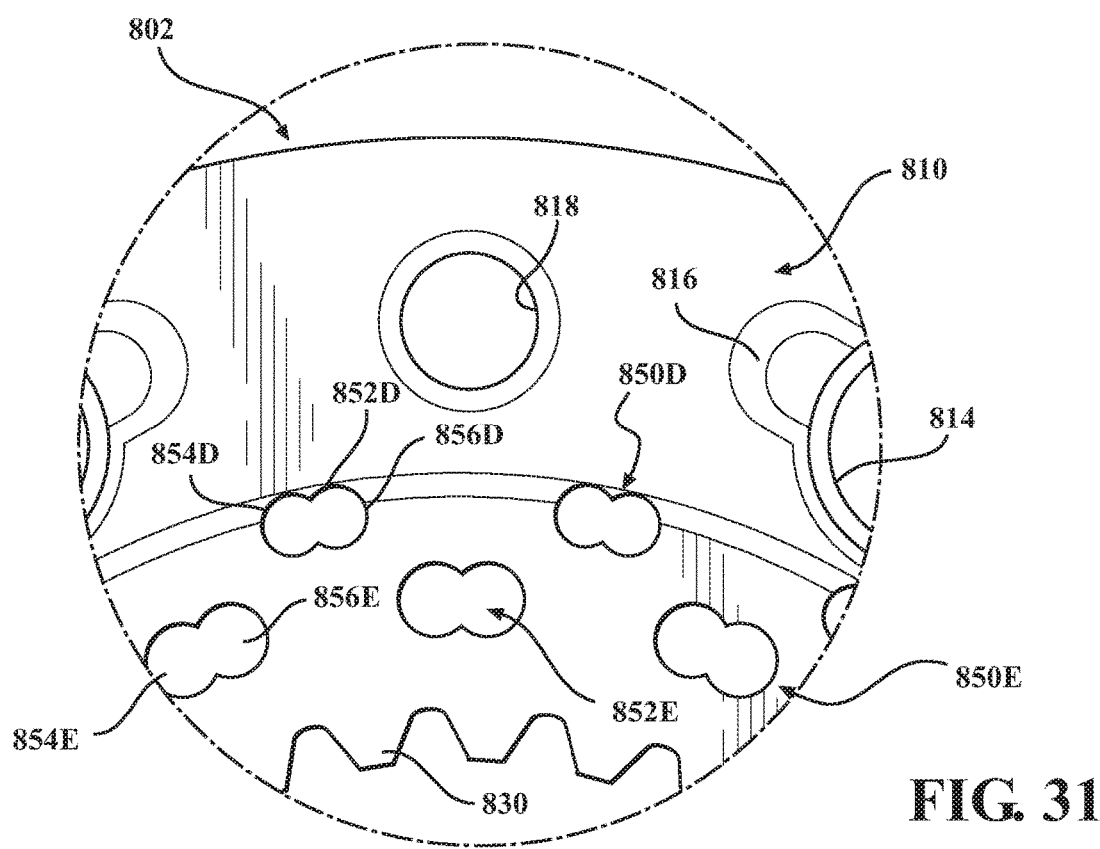

FIGS. 30 and 31 illustrate a fourth alternative embodiment of the crack arresting feature associated with carrier ring 810 of carrier unit 802. In particular, a first plurality of lobe-type crack mitigating apertures 850D and a second plurality of lobe-type crack mitigation apertures 850E are shown aligned in a staggered orientation along first and second diameters relative to clutch teeth 830. The first plurality of lobe-type apertures 850D include a series of through and/or partial depth holes or bores 852D each having a first bore portion 854D and a second bore portion 856D. The dimensions (i.e. diameter and depth) of first and second bore portions 854D, 856D may be identical or different. The second plurality of lobe-type crack mitigating apertures 850E include a series of through and/or partial depth holes or bores 852E, each having a first bore portion 854E and a second bore portion 856E. The dimensions (i.e. diameter and depth) of first and second bore portions 854E, 856E may be identical or different. FIG. 31 illustrates the overall size of first apertures 850D to be generally smaller than the overall size of second apertures 850E to reflect one non-limiting arrangement.

The above described alternative spacing described with respect to the bores 852A and 852B may also be applied to the apertures 850D and 850E.

FIGS. 32 and 33 illustrate a fifth alternative embodiment of the crack arresting feature associated with carrier ring 810 of carrier unit 802. In particular, a plurality of arc-shaped apertures 860 may be disposed on the carrier ring 810. The apertures 860 may have a first end 860A and a second end 860B, with the first end 850A being closer to the center of the carrier ring 810. The apertures may extend fully through the carrier ring 810, or may be partial depth apertures that extend into the surface of the carrier ring 810 but do not extend fully through the carrier ring 810.

The apertures 860 may be positioned by utilizing finite element analysis (FEA) to define the specific shape and location of the crack arresting feature. With reference to FIG. 32, torque may applied in the clockwise direction when the carrier ring 810 is highest loaded, as shown by the arrow. As described above, the feature may be a crescent or arc-shaped aperture 860. Based on the FEA, the aperture 860 may be disposed between the mounting holes 814 and the clutch teeth 830 and in the area where compressive stress is present due to the clockwise torque illustrate in FIG. 32.

Similar to the above-described crack-arresting features, the aperture 860 is positioned and shaped to intercept a crack, such as crack C4 in FIG. 32, that propagates from the teeth 830 toward the mounting hole 814. In this manner, the aperture 860 may be positioned to block the mounting hole 814 from receiving the crack C4 as it propagates.

With reference to FIG. 33, the mounting hole 814 is shown centered between four quadrants I-IV. The aperture is disposed in quadrant IV, which is the quadrant in which the crack C4 will propagate when the torque is clockwise.

In one aspect, the inner portion of the aperture 860 may be aligned approximately parallel to the load path as it approaches the clutch teeth 830. The aperture 860 may then also follow the contour of the mounting hole 814 to define its arcuate shape and develop the outer edge of the arc-shape. The actual radius and/or width of the aperture may be determined and refined based on FEA and actual stress patterns.

In this approach, with the arc-shaped apertures 860 operating to block the mounting holes 814 from receiving a propagating crack, there may be an equal number of apertures 860 as there are mounting holes 814, with one aperture 860 associated with each one of the mounting holes 814. The apertures 860 may be centered on a common diameter relative to the center of the carrier ring 810, such that apertures 860 are approximately the same distance from each of the mounting holes 814.

In another aspect, the apertures 860 may be centered on different diameters from the center of the carrier ring 810, being shifting in the direction of the expected crack propagation toward the mounting hole 814 to which the aperture 860 is associated, such that some apertures 860 may be closer to the teeth 830 than others.

In another aspect, the number of apertures 860 may be doubled relative to the mounting holes 814, and the additional apertures 860 may be similarly positioned to receive a crack propagating from the opposite direction to account for torques that are created in both the clockwise and counter-clockwise direction.

The apertures 860 may all be the same size, or they may have different sizes, depending on the FEA.

The present disclosure is not limited to carrier units of the type used only in two-speed planetary gearsets in transfer cases or other types of power transfer assemblies (i.e. automatic transmissions, etc.), but can be used with any carrier unit of any planetary gearset exposed to cyclical loading and fatigue stress. While carrier unit 802 is disclosed as a two-piece unit, single-piece configurations are also within the scope of this disclosure. While not limited thereto, powered metal carrier units can be formed with the crack arresting apertures without the need of a secondary machining operation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A planetary gearset comprising:
   a sun gear;
   a ring gear;
   a carrier unit;
   a planet gear rotatably supported by said carrier unit and in meshed engagement with said sun gear and said ring gear,
   wherein said carrier unit is formed to include at least one crack arresting feature configured to inhibit propagation of a stress crack.

2. The planetary gearset of claim 1, wherein the carrier unit includes clutch teeth adapted to be selectively engaged with a clutch, wherein said at least one crack arresting feature is located in proximity to said clutch teeth to inhibit propagation of the stress crack originating at one of said clutch teeth.

3. The planetary gearset of claim 2, wherein said crack arresting feature includes a plurality of crack mitigating apertures formed in said carrier unit adjacent to said clutch teeth.

4. The planetary gearset of claim 3, wherein said apertures are aligned along a common diameter and are circumferentially-oriented with respect to said clutch teeth.

5. The planetary gearset of claim 4, wherein said apertures are throughbores.

6. The planetary gearset of claim 4, wherein said apertures are partial depth bores.

7. The planetary gearset of claim 4, wherein said apertures are lobe-shaped.

8. The planetary gearset of claim 4, wherein said apertures are arc-shaped.

9. The planter gearset of claim 8, wherein said apertures include a radially inner end and a radially outer end and define a curvature therebetween.

10. The planetary gearset of claim 2, wherein said crack arresting feature includes a plurality of first crack mitigating apertures and a plurality of second crack mitigating apertures, wherein said first and second apertures are formed in said carrier unit adjacent to said teeth, and wherein said first apertures are aligned along a first diameter and said second apertures are aligned along a second diameter.

11. The planetary gearset of claim 10, wherein said first apertures are staggered with respect to said second apertures.

12. The planetary gearset of claim 3, wherein said carrier unit is a powdered metal component, and wherein said crack arresting feature is a crack mitigating aperture formed in the carrier unit during powdered metal fabrication.

13. The planetary gearset of claim 1, wherein said carrier unit includes a central aperture, and wherein said crack arresting feature is oriented in proximity to said central aperture, wherein said feature includes a plurality of crack mitigating bores surrounding said central aperture.

14. A transfer case for a vehicle, the transfer case comprising:
   a rotary input shaft operational at a first speed;
   a rotary output shaft;
   a sun gear configured for concurrent rotation with the rotary input shaft;
   a ring gear;
   a carrier unit;
   a planet gear rotatably supported by said carrier unit and in meshed engagement with said sun gear and said ring gear;
   a range mechanism configured to shift between meshed engagement with the rotary input shaft to drive the rotary output shaft at the first speed and meshed engagement with the carrier unit to drive the rotary output shaft at a second speed;
   wherein said carrier unit is formed to include at least one crack arresting feature configured to inhibit propagation of a stress crack.

15. The transfer case of claim 14, wherein the crack arresting feature comprises a plurality of apertures extending at least partially through a carrier ring of the carrier unit, wherein the carrier ring includes a plurality of teeth configured for meshed engagement with the range mechanism and a plurality of mounting holes for supporting the planet gears for rotation, wherein the plurality of apertures are disposed radially between the plurality of teeth and the mounting holes.

16. The transfer case of claim 15, wherein all of the plurality of apertures are arranged at approximately the same diameter from a diametrical center of the carrier unit.

17. The transfer case of claim 15, wherein the plurality of apertures are arranged at different diameters from a diametrical center of the carrier unit.

18. The transfer case of claim 15, wherein the apertures have an arc shape with a radially inner end and radially outer end, wherein the arc shape is concave in a radially outer direction.

19. The transfer case of claim 18, wherein the number of apertures corresponds to the number of mounting holes.

20. The transfer case of claim 19, wherein the apertures are disposed along a load path extending between the teeth and the mounting holes to intercept a crack originating at the teeth and propagating toward the mounting holes.

* * * * *